US012671868B2

(12) United States Patent
Weber et al.

(10) Patent No.: US 12,671,868 B2
(45) Date of Patent: Jun. 30, 2026

(54) SYSTEM, DEVICE, AND METHOD FOR USER CUSTOMIZABLE STREAMING VIDEO PLAYBACK

(71) Applicant: Nutshell Media, Inc., Woodland Hills, CA (US)

(72) Inventors: F. Elmo Weber, Woodland Hills, CA (US); Alan Rasulovich Omarov, Belgrade (RS)

(73) Assignee: Nutshell Media, Inc., Woodland Hills, CA (US)

( * ) Notice: Subject to any disclaimer, the term of this patent is extended or adjusted under 35 U.S.C. 154(b) by 0 days.

(21) Appl. No.: 19/191,741

(22) Filed: Apr. 28, 2025

(65) Prior Publication Data

US 2025/0343972 A1 Nov. 6, 2025

Related U.S. Application Data

(60) Provisional application No. 63/641,048, filed on May 1, 2024.

(51) Int. Cl.

| | |
|---|---|
| *H04N 21/21* | (2011.01) |
| *H04N 21/231* | (2011.01) |
| *H04N 21/234* | (2011.01) |
| *H04N 21/235* | (2011.01) |
| *H04N 21/25* | (2011.01) |
| *H04N 21/439* | (2011.01) |
| *H04N 21/462* | (2011.01) |
| *H04N 21/482* | (2011.01) |
| *H04N 21/63* | (2011.01) |

(Continued)

(52) U.S. Cl.
CPC ..... *H04N 21/462* (2013.01); *H04N 21/23109* (2013.01); *H04N 21/4394* (2013.01); *H04N 21/482* (2013.01)

(58) Field of Classification Search
None
See application file for complete search history.

(56) References Cited

U.S. PATENT DOCUMENTS

| | | | |
|---|---|---|---|
| 5,805,733 A | 9/1998 | Wang et al. | |
| 5,913,013 A | 6/1999 | Abecassis | |

(Continued)

FOREIGN PATENT DOCUMENTS

| | | |
|---|---|---|
| EP | 3518494 A1 | 7/2019 |

*Primary Examiner* — Brian T Pendleton
*Assistant Examiner* — Jean D Saint Cyr
(74) *Attorney, Agent, or Firm* — Olav M. Underdal; IDP Patent Services

(57) ABSTRACT

A system for customizable video playback includes: a customizable video playback server including a video database and a playback manager; and a plurality of customizable video playback devices, each including a dynamic index file and a playback controller, wherein the customizable video playback device enables a user to select a source video from the video database, and select a list of variable length video chunks from the source video, such that the variable length video chunks are sequenced by the dynamic index file, according to sequencing input from the user, to produce a customized video. Also disclosed is a method for customizable video playback, including selecting a source video, selecting variable-length video chunks, sequencing the customized video using a dynamic index file, and playing the customized video.

17 Claims, 17 Drawing Sheets

System for Customizable Video Playback

(51) Int. Cl.
  *H04N 21/65* (2011.01)
  *H04N 21/654* (2011.01)

(56) References Cited

U.S. PATENT DOCUMENTS

| | | | |
|---|---|---|---|
| 7,697,785 B2 | 4/2010 | Chiu et al. | |
| 8,027,568 B1 | 9/2011 | Abecassis | |
| 8,208,789 B2 | 6/2012 | Brodersen et al. | |
| 8,234,350 B1 | 7/2012 | Gu et al. | |
| 8,392,183 B2 | 3/2013 | Weber | |
| 8,695,029 B2 | 4/2014 | Lecomte et al. | |
| 8,812,311 B2 | 8/2014 | Weber | |
| 8,818,803 B2 | 8/2014 | Weber | |
| 8,837,903 B2 | 9/2014 | Park et al. | |
| 9,407,945 B2 | 8/2016 | Alexander | |
| 9,621,928 B2 | 4/2017 | Manzari et al. | |
| 9,661,294 B2 | 5/2017 | Oh et al. | |
| 9,794,641 B2 | 10/2017 | Shackleton et al. | |
| 9,986,290 B2 | 5/2018 | Ayers et al. | |
| 10,122,781 B2 | 11/2018 | Degrange | |
| 10,424,341 B2 | 9/2019 | Thornton et al. | |
| 10,432,993 B2 | 10/2019 | Nugent | |
| 10,631,046 B2 | 4/2020 | Baumann et al. | |
| 10,757,153 B2 | 8/2020 | DeGrange | |
| 10,785,180 B2 | 9/2020 | Faenger et al. | |
| 10,880,351 B1 | 12/2020 | Estus et al. | |
| 2003/0041110 A1 | 2/2003 | Wenocur et al. | |
| 2005/0232290 A1 | 10/2005 | Mathew et al. | |
| 2008/0028092 A1 | 1/2008 | Shen | |
| 2008/0187231 A1 | 8/2008 | Barbieri et al. | |
| 2009/0100454 A1 | 4/2009 | Weber | |
| 2010/0002137 A1 | 1/2010 | McKinney et al. | |
| 2013/0287096 A1 | 10/2013 | Vanderheijden et al. | |
| 2016/0112739 A1 | 4/2016 | Rothschild et al. | |
| 2016/0211004 A1 | 7/2016 | Akatiff et al. | |
| 2018/0077467 A1 | 3/2018 | Novobilski | |
| 2018/0176623 A1 | 6/2018 | Nugent | |
| 2018/0241836 A1* | 8/2018 | Arsenault | H04L 65/65 |
| 2018/0324502 A1 | 11/2018 | Degrange | |
| 2020/0210711 A1 | 7/2020 | Scanlon et al. | |
| 2021/0120057 A1 | 4/2021 | Estus et al. | |
| 2021/0312948 A1 | 10/2021 | Haley et al. | |
| 2023/0179839 A1 | 6/2023 | Yin et al. | |
| 2024/0163532 A1* | 5/2024 | Lythcott-Haims | H04N 21/4667 |

* cited by examiner

System for Customizable Video Playback

Customizable Video Playback Server

Customizable Video Playback Device

Standard Segmentation for HLS

Logical Segmentation

Frame #1

Audio Buffer #1  Audio Buffer #2

Audio Buffer Cut

Figure 4C:
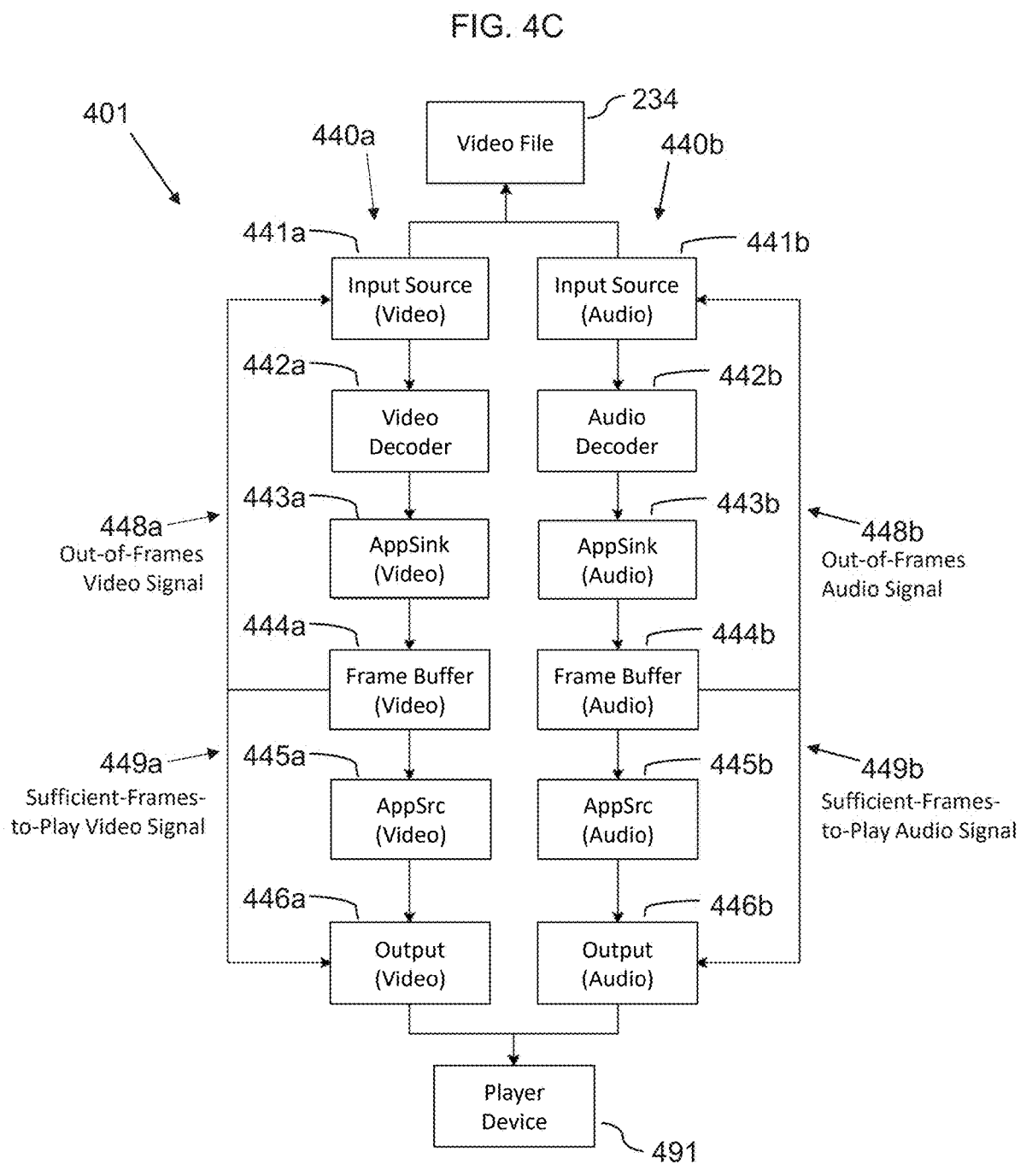

234
Video File

440b

441a

441b

Input Source
(Video)

Input Source
(Audio)

442a

442b

Video
Decoder

Audio
Decoder

448a
Out-of-Frames
Video Signal

443a

443b

448b
Out-of-Frames
Audio Signal

AppSink
(Video)

AppSink
(Audio)

444a

444b

Frame Buffer
(Video)

Frame Buffer
(Audio)

449a
Sufficient-Frames-
to-Play Video Signal

445a

445b

449b
Sufficient-Frames-
to-Play Audio Signal

AppSrc
(Video)

AppSrc
(Audio)

446a

446b

Output
(Video)

Output
(Audio)

Player
Device

SEGMENTS          FRAMES

501

510

| | |
|---|---|
| DX | 170473 — 512 |
| | 170510 |
| DX | 514 |
| | 170593 — 518 |
| SHOT | 522 |
| | 170686 |
| DX | 516 |
| | 170853 |
| SHOT | 524 |
| | 170925 |

530
Sub-Shot
Chunks

| Chunk Number | Video Chunks | Segment Number | Segment Type | Start Frame | End Frame | Trim% | Segment Length | Segment Significance Value | Included? |
|---|---|---|---|---|---|---|---|---|---|
| 6492 | | 1623 | DX | 170474 | 170509 | | 37 | 10.45 | NO |
| 6493 | | 1624 | DX | 170510 | 170592 | | 83 | 19.18 | NO |
| 6494 | | 1625 | SHOT | 170609 | 170685 | 55.17% | 51 | 21.54 | YES (partial) |
| 6503 | | | | | | | | | |
| 6504 | | 1626 | DX | 170686 | 170852 | | 166 | 15.06 | YES |
| 6505 | | 1627 | SHOT | 170853 | 170827 | 58.33% | 41 | 17.59 | NO |
| 6514 | | | | | | | | | |
| 6516 | | 1628 | DX | 170925 | 170976 | | 51 | 12.07 | NO |
| 6517 | | 1629 | DX | 170977 | 170032 | | 55 | 17.32 | YES |
| 6518 | | 1630 | SHOT | 171033 | 171099 | 57.78% | 66 | 22.58 | YES (partial) |
| 6527 | | | | | | | | | |
| 6528 | | 1631 | DX | 171100 | 171148 | | 48 | 9.94 | NO |

Video Data Structure

Object Data Structure

Dynamic Index File Data Structure

Method for Customizable Video Playback

Method for Segment Significance Calculation

Method for Customizable Video Live Streaming

SYSTEM, DEVICE, AND METHOD FOR USER CUSTOMIZABLE STREAMING VIDEO PLAYBACK

CROSS-REFERENCE TO RELATED APPLICATIONS

This application claims the benefit of U.S. Provisional Application No. 63/641,048, filed May 1, 2024; which is hereby incorporated herein by reference in its entirety.

FIELD OF THE INVENTION

The present invention relates generally to the field of streaming of audiovisual information, and in particular HTTP adaptive bitrate streaming protocols such as HTTP live streaming (HLS) or The Moving Picture Experts Group (MPEG)-dynamic adaptive streaming over HTTP (MPEG-DASH), and more particularly to methods and systems for expanding the functionality of these protocols to allow for dynamic playback of multiple customized temporal versions of a given video.

BACKGROUND OF THE INVENTION

Streaming is a way of delivering video and audio data over the Internet, enabling a receiving playback device to start displaying the data before it fully loads. This allows the client to start playing the video without downloading the entire video.

Recent years have seen the rapid adoption of Adaptive Bitrate (ABR) streaming over Hypertext transfer protocol (HTTP), used in Video on Demand (VoD), Over the Top (OTT), Pay TV and other internet-based media delivery services, including mobile devices.

HTTP is a layer 7 protocol for internet communication. Web applications use HTTP to send data back and forth in a way that devices at both ends will be able to interpret.

Adaptive bitrate streaming is a method of video streaming over HTTP wherein the source content is segmented into small equal-length video chunks which are sequenced by an M3U8 index file. Multiple identical sets of video chunks are created at various bit rates, each set is sequenced by a similar index file. The system measures the internet bandwidth available to each receiving device, prompting a switch to a different bit rate when bandwidth conditions change. This makes it possible to stream videos at different quality levels, and to seamlessly switch in the middle of a video from one quality level to another.

HTTP Live Streaming (HLS) is an adaptive bitrate streaming protocol introduced by Apple in 2009. HLS is similar to MPEG-DASH, another streaming protocol, in that it breaks videos down into smaller chunks and encodes those chunks at different quality levels.

Both HLS and MPEG-DASH use HTTP, the advantage being that most of the Internet already uses HTTP. With HTTP, the stream uses a standard port (port 80 or 443) that is almost always open. This ensures that the stream is rarely blocked by a firewall, which can block streaming protocols that use specialized or unusual ports. Both protocols expect the video files to be stored in smaller chunks of equal length, typically 10 seconds each for HLS and 6 seconds each for MPEG-DASH.

The above-mentioned adaptive bitrate streaming protocols were an important development in video streaming. The existing method of splitting the master video into multiple equal-length chunks that are sequenced by a static index file, enables ability to switch from one set of chunks to other duplicate chunk sets with different bit rates. This solves major streaming problems associated with buffering and seamless bit rate adaptation.

Furthermore, the existing method also solves the problem of keyframe management by using a keyframe at the head of each chunk so that when the chunk switch occurs, there are no compression artifacts of unresolved frames. This keyframe management makes the whole method easily scalable since there is no additional server-side processing required to stitch the chunks back together.

However, existing streaming methods and systems do not allow for simultaneous streaming of different streams that are customized from the same source video, and they do not allow for variable-length chunking of video streams.

As such, considering the foregoing, it may be appreciated that there continues to be a need for novel and improved devices and methods for customizable video streaming.

SUMMARY OF THE INVENTION

The foregoing needs are met, to a great extent, by the present invention, wherein in aspects of this invention, enhancements are provided to the existing model of video streaming.

In an aspect, a system for customizable video playback can include:
- a) A customizable video playback server, which can include:
  - i. a video database, which can be configured to store a plurality of source videos; and
- b) A customizable video playback device, which can include:
  - i. a dynamic index file;
- wherein the customizable video playback device can be configured to enable a user to select a source video from the plurality of source videos in the video database;
- wherein the customizable video playback device is configured to enable the user to select a list of variable length video chunks from the selected source video;
- wherein the variable length video chunks are sequenced by the dynamic index file, according to sequencing input from the user, to produce a customized video, which is customization of the selected source video based on sequencing of the variable length video chunks, according to the dynamic index file.

In a related aspect, a customizable video playback server can include:
- a) A server processor;
- b) A server non-transitory memory;
- c) A server input/output component;
- d) A video database, which comprises a plurality of videos; and
- e) A playback manager, which is configured to retrieve and process videos from the video database; all connected via
- f) A server data bus.

In another related aspect, a customizable video playback device can include:
- a) A device processor;
- b) A device non-transitory memory;
- c) A device input/output device;
- d) A dynamic index file, which is configured to sequence selected variable length video chunks from a source video in the video database; and e) A playback controller, which is configured to sequence selected variable length video chunks from a source video in the video database; all connected via f) A device data bus.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4C is a first example embodiment of a customizable video playback system implemented as a segmentizer player, according to an embodiment of the invention.

FIG. 4D is a second example embodiment of a customizable video playback system implemented as a web-based player, according to an embodiment of the invention.

FIG. 4E is a schematic diagram illustrating HLS chunk encodings of the second example embodiment of a customizable video playback system, according to an embodiment of the invention.

FIG. 5C is a schematic diagram illustrating a dynamic index file in the form of a sequencing of DX and SHOT segments of a video timeline, according to an embodiment of the invention.

FIG. 5D is a schematic diagram illustrating front trimming of a first SHOT and end trimming of a second SHOT.

DETAILED DESCRIPTION

Figure 1:
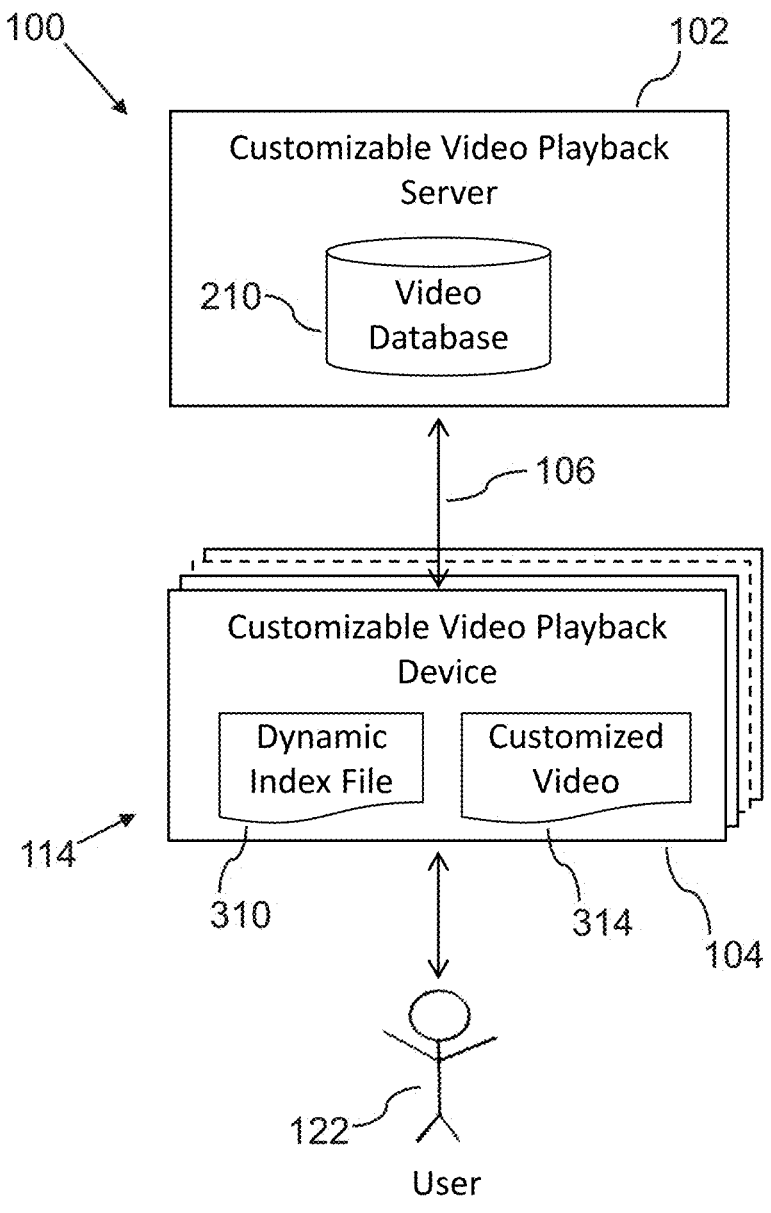
FIG. 1 is a schematic diagram illustrating a system for customizable video playback, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

The customizable video playback system 100 described herein addresses the challenge of obtaining various content representations from a single video source based on user-defined settings. The disclosed algorithm introduces a dynamic approach, allowing users to extract specific elements or generate summaries tailored to their preferences.

More specifically, the customizable video playback system 100 provides a method and system built on top of HTTP adaptive bitrate streaming protocols such as HLS and MPEG-DASH, wherein the protocols are characterized by comprising a plurality of small equal-length video chunks which are sequenced by a static M3U8 playlist file.

In contrast to the conventional HTTP-based adaptive bitrate streaming protocols, the customizable video playback system 100 introduces novel improvements that allow a multitude of individual separate viewers to initiate the simultaneous streaming of custom re-edited temporal versions of the same video, while still maintaining the adaptive bitrate functionality of the original protocols. These improvements include:

a) The subject video is divided into custom-length video chunks, each having a unique and meaningful time-length based segmentation boundaries of visual and audio events contained in the subject video, in contrast to the prior art which uses equal length video chunks that have no relationship to the visual and audio events; and b) The custom-length video chunks are sequenced by a dynamic index file 310 which is populated by algorithm aided user input, as opposed to the static index file of the original protocol.

In the following, we describe the structure of an embodiment of a customizable video playback system 100 with reference to FIG. 1, in such manner that like reference numerals refer to like components throughout; a convention that we shall employ for the remainder of this specification.

In an embodiment, as shown in FIGS. 1, 2, 3, and 5C, a system for customizable video playback 100 can include:

a) A customizable video playback server 102, which can include:

i. a video database 210, which can be configured to store a plurality 212 of source videos 214; and b) A customizable video playback device 104, which can include:

i. a dynamic index file 310, which is configured to sequence selected video chunks 591 from a plurality 590 of video chunks 591 of a selected source video 214 in the video database 210;

wherein the customizable video playback device 104 can be configured to enable a user 122 to select the selected source video 214 from the plurality 212 of source videos 214 in the video database 210 of the customizable video playback server 102;

wherein a playback controller 312 of the customizable video playback device 104 can be configured to enable the user 122 to select a list of variable length video chunks 591 from the selected source video 214; and wherein the playback controller 312 of the customizable video playback device 104 can be configured to enable the variable length video chunks 591 to be sequenced by the dynamic index file 310, according to sequencing input from the user 122, to produce a customized video 314, which is customization of the selected source video 214 based on sequencing of the variable length video chunks 591, according to the dynamic index file 310;

such that the selected video chunks 591 are sequenced by the dynamic index file 310, according to sequencing input from the user 122, to produce a customized video 314, which is a customization of the selected source video 214 based on sequencing of the selected video chunks 591 according to the dynamic index file 310;

such that the customizable video playback device 104 is configured to play the selected source video 214 and the customized video 314.

Figure 2:
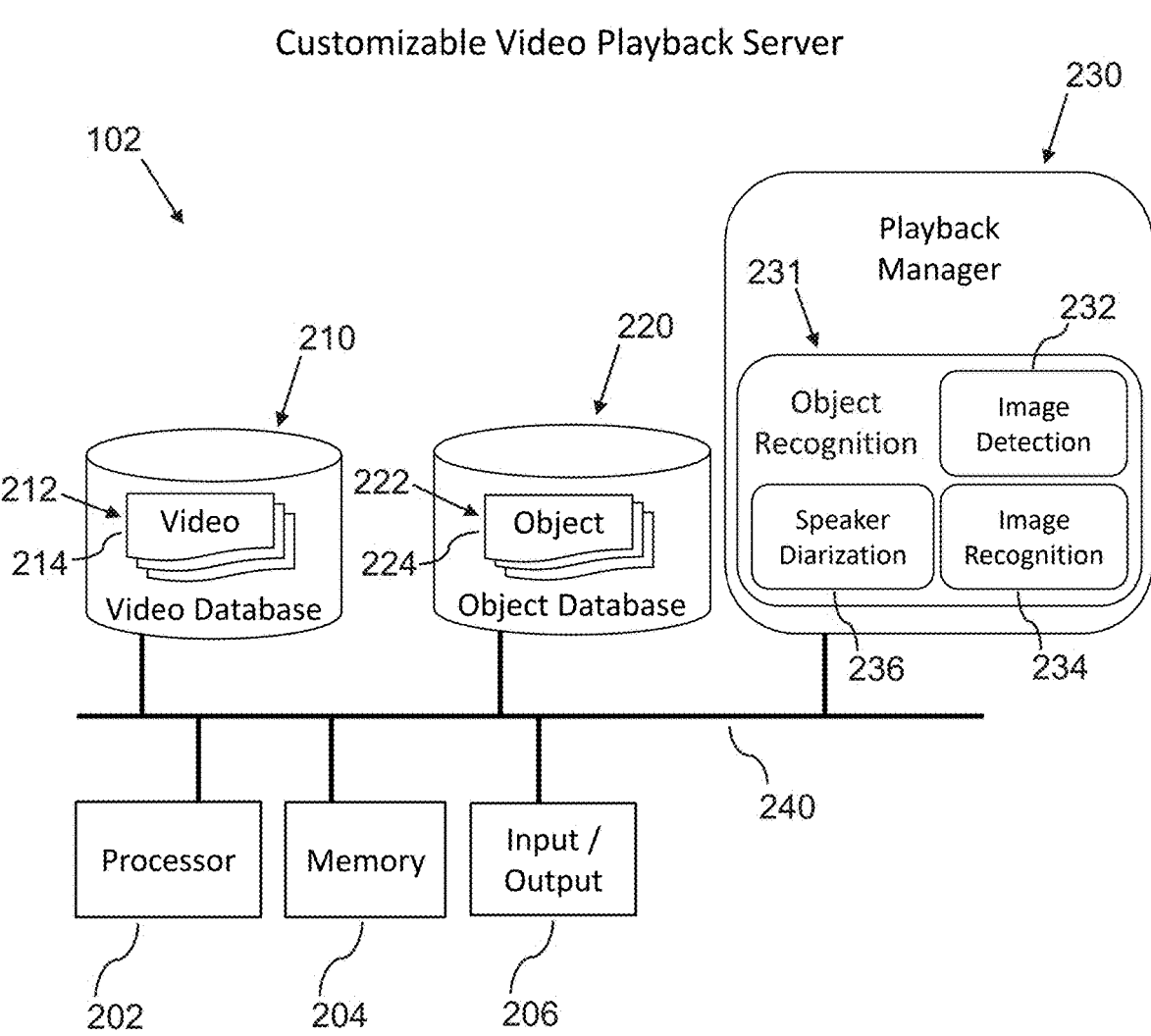
FIG. 2 is a schematic diagram illustrating a customizable video playback server, according to an embodiment of the invention.
Figure 6A:
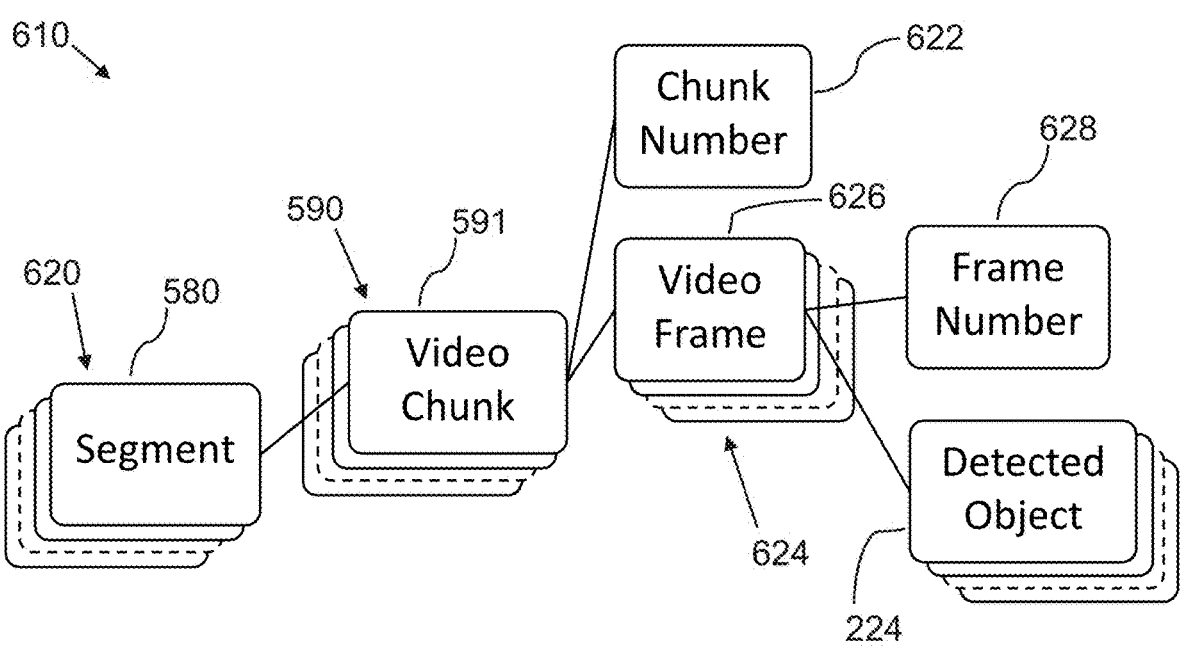
FIG. 6A is a schematic diagram illustrating a data structure for a video in the video database, according to an embodiment of the invention.

In a related embodiment, as shown in FIGS. 2 and 6A, a data structure 610 for a source video 214 can include an ordered sequence 620 of segments 580, wherein each corresponding segment 580 can include:

a) an ordered sequence 590 of corresponding video chunks 591, 592, 594 (or at least one video chunk 591, wherein each video chunk 591, 592, 594 can include:

i. a source chunk number 622; and ii. an ordered sequence 624 of video frames 626, wherein each video frame 626 can further comprise:

1. a source frame number 628.

In a further related embodiment, each video chunk 592 can include a variable number of video frames 626, such that the ordered sequence of corresponding video chunks 591 are variable length video chunks 591, such that the variable length video chunks 591 are each separately configurable with an independent variable length 595, which is based on the segment length of a corresponding segment 580, such that an aggregated length 597 of all video chunks 591 in the ordered sequence 590 of video chunks 591, 592, 594 is equal to the segment length 587;

whereby the variable length video chunks 592 are configured to enable a chunking of corresponding segments 580 of the selected source video 214 and the customized video 314, without any variable length video chunk 592 overlapping between successive segments 580.

Figure 6B:
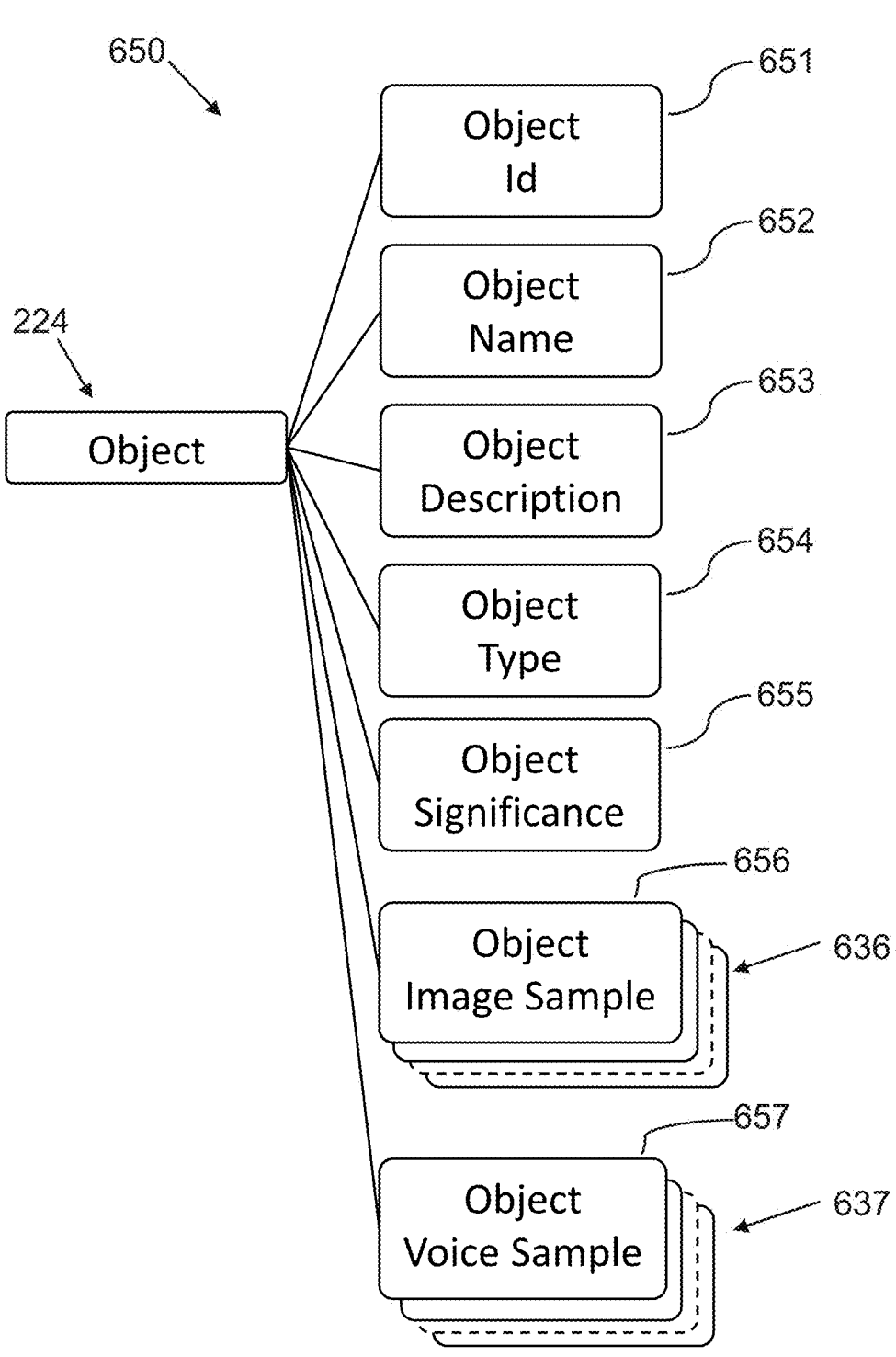
FIG. 6B is a schematic diagram illustrating an object data structure for an object in the video database, according to an embodiment of the invention.
Figure 6C:
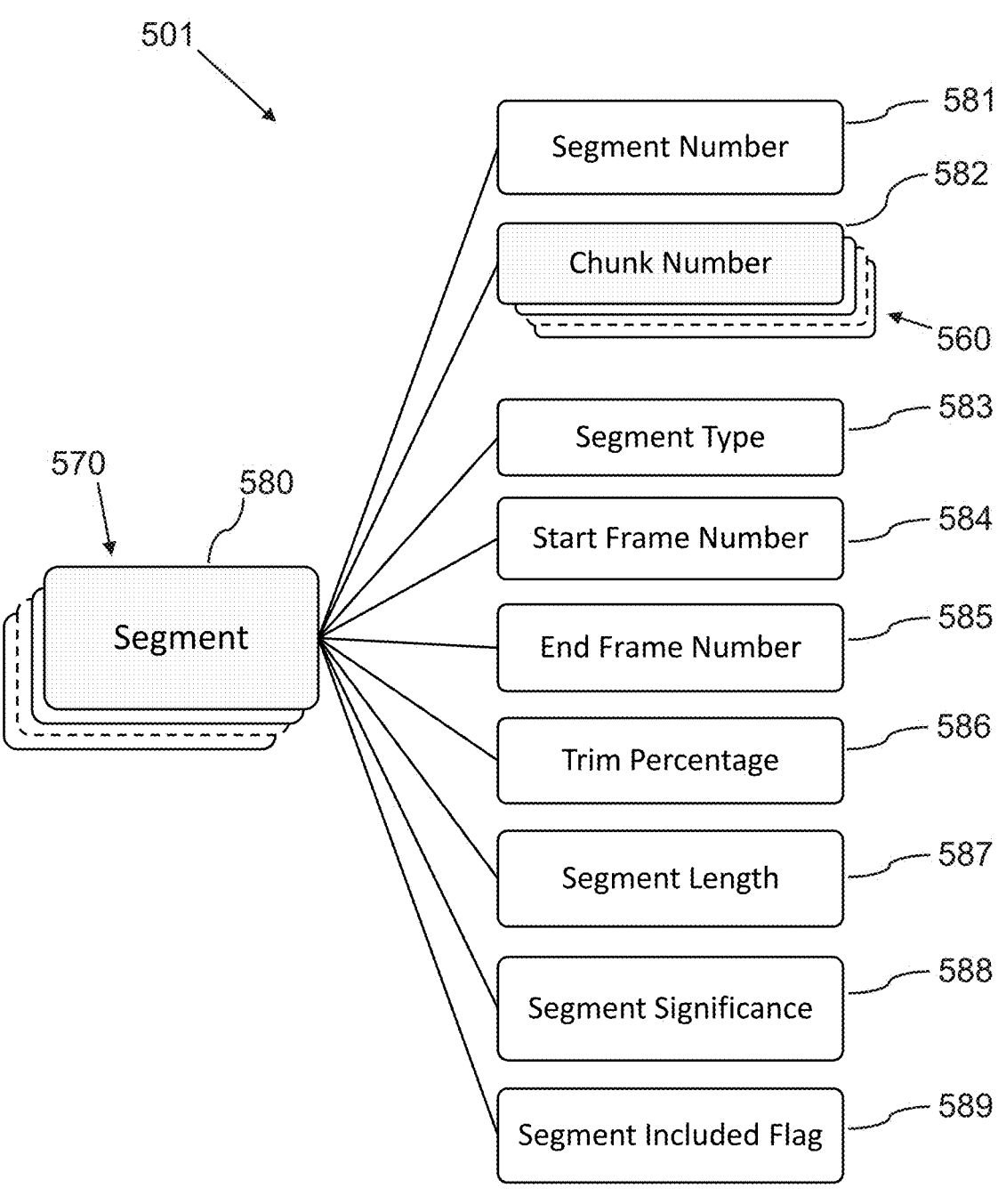
FIG. 6C is a schematic diagram illustrating a data structure for a dynamic index file, according to an embodiment of the invention.

In a related embodiment, as shown in FIGS. 2, 6A, and 6C, a customizable video playback server 102 can include:

a) A server processor 202;

b) A server non-transitory memory 204;

c) A server input/output component 206;

d) A video database 210, which comprises a plurality 212 of videos 214; and e) An object database 220, which comprises a plurality 222 of objects 224; and f) A playback manager 230, which is configured to retrieve and process videos 214 from the video database 210; all connected via g) A server data bus 240.

Figure 3:
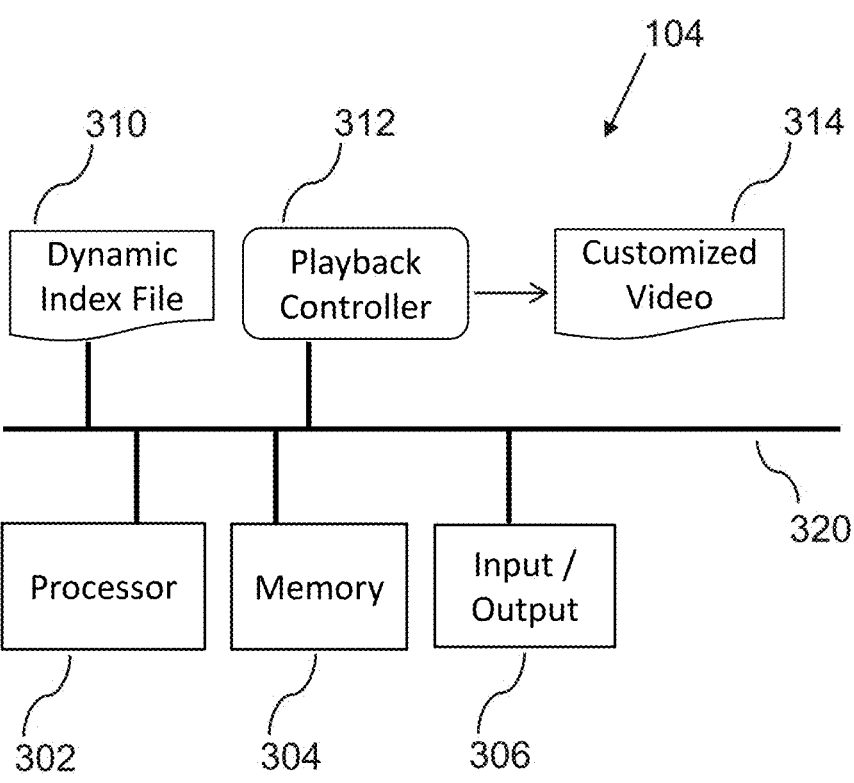
FIG. 3 is a schematic diagram illustrating a customizable video playback device, according to an embodiment of the invention.

In a related embodiment, as shown in FIGS. 3 and 6C, a customizable video playback device 104 can include:

a) A device processor 302;

b) A device non-transitory memory 304;

c) A device input/output 306;

d) A dynamic index file 310, which is configured to sequence selected variable length video chunks 591 from a source video in the video database 210 and is configured to play videos 214, 314; and e) A playback controller 312, which is configured to play the selected variable length video chunks 591 from the selected source video 214 in the video database 210; all connected via f) A device data bus 320;

wherein the playback controller 312 can be configured to create and update the dynamic index file 310, based on sequencing input from the user.

Figure 4A:
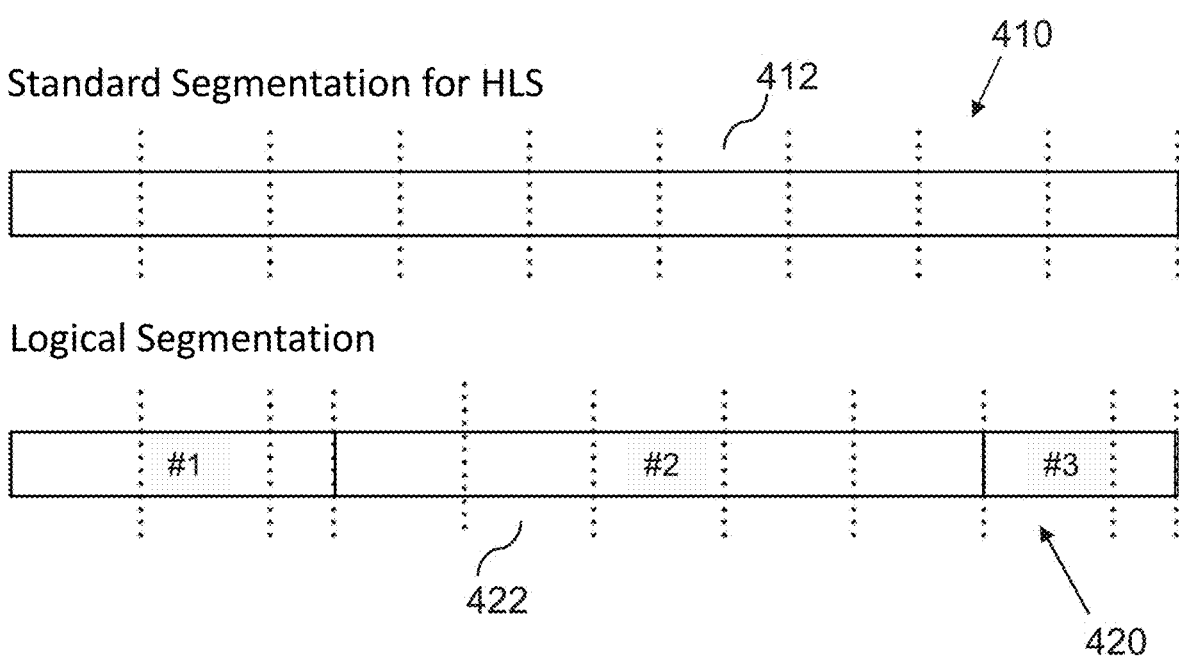
FIG. 4A is a schematic diagram illustrating a logical segmentation of a customized video file, as compared to a standard physical segmentation of a conventional video file, according to an embodiment of the invention.

In various related embodiments, as shown in FIGS. 2, 3, 4A, 5C, and 6C, the customizable video playback system 100 described herein introduces important novel functionality to conventional adaptive bitrate streaming protocols, introducing a method and system facilitating customizable video playback of alternate temporal versions such as summarized versions, character-weighted versions, and concept-weighted versions. In related embodiments, the customizable video playback system 100 can:

a) Provide a plurality of variable-length video chunks 591, each having a unique and meaningful length based on segmentation of visual and audio events contained in the subject video into a customized video 314 comprising logical segments 422, as shown in FIG. 4A. This is in contrast to the equal-length chunks 412 of the existing protocol for conventional video files 214, wherein the physical boundaries of which have no meaning or relationship to the content of the video;

b) Allow video chunks 591 to be sequenced by a dynamic index file 310, which is populated by algorithm aided user input, as opposed to the static index file of the original protocol which simply commands the chunks to play in a pre-determined order that never changes; and c) Based on commands of the end user, an algorithm can be configured to determine which of the variable-length video chunks will be played and which will be skipped during each temporal playback, this generates a new index list to sequence the chunks. The index list can be manipulated many times by the end user throughout the playback of a video program, basically re-editing the video on the fly.

In one embodiment, the end user may be watching a summarized version of a video program defined according to a summarization algorithm, such that the compression ratio of which may be changed many times by the end user throughout the playback of the video program, such that:

a) A start frame and an end frame define boundaries of the segment in original video file. A significance value assigned to each segment can be defined, to be used as a parameter for segments filtration; and b) Application requires a HLS stream to be prepared such that, along with splitting the video into chunks, playback follows boundaries of segments defined by the summarization algorithm.

Figure 4B:
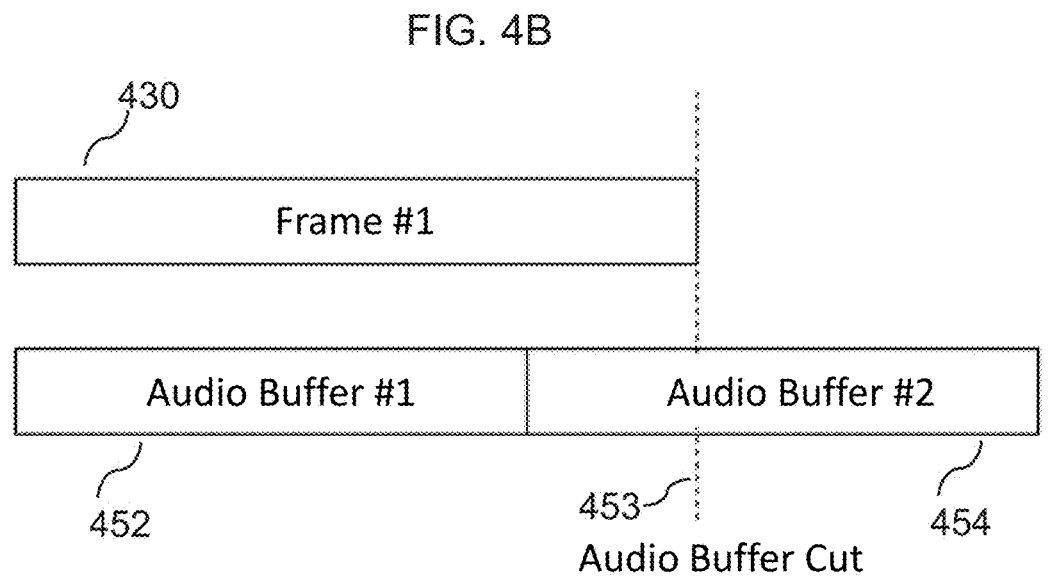
FIG. 4B is a schematic diagram illustrating a logical segmentation of a video buffer across frames, according to an embodiment of the invention.

In a first example embodiment 401, as shown in FIGS. 1, 4B and 4C, the customizable video playback system 100 can be implemented such that the customizable video playback device 104 in a first example embodiment is configured as a segmentizer player 491, wherein:

a) An operating platform/tech stack can for example include: C++ using Qt and GStreamer software libraries;

b) The customizable video playback device 104 is configured to play segments set seamlessly without re-encoding the video. Segments are arranged in time order and may have gaps between each other; and c) Implementation details can include:

i. Creating of a complex Gstreamer pipeline, which includes input video 441a, input audio 441b; and output video 446a output audio 446b parts;

ii. Wherein an input pipeline includes one video pipeline 440a for video data and one audio pipeline 440b for audio data running independently;

iii. Each input pipeline 440a, 440b can include:

1. A decoder 442a, 442b, including a video decoder 442a and an audio decoder 442b, respectively;

2. An application sink element 443a, 443b (i.e., a custom application-controlled sink), including a video application sink element 443a and an audio application sink element 443b, respectively, which generates signals about new available data portions and decoding. For video data it can be one frame 430, for audio it can be audio track parts of different length;

3. A frame buffer 444a, 444b, including a video frame buffer 444a and an audio frame buffer 444b, respectively;

wherein out-of-frame video signals 448a and out-of-frame audio signals 448b can be rejected and sent back for reprocessing in the video input pipeline 440a and the audio input pipeline 440b, respectively; and wherein sufficient-frames-to-play video signals 449a and sufficient-frames-to-play audio signals 449b can be sent forward to the video pipeline 440a and audio pipeline 440b, respectively;

4. An application source element 445a, 445b (i.e., a custom application-controlled source element), including a video application source element 445a and an audio application source element 445b, respectively;

5. An output pipeline 446a, 446b, including a video output pipeline 446a and an audio output pipeline 446b, respectively;

iv. In order to receive audio buffers 444b, 452, 454 of bigger length than needed, the customizable video playback device 104 can be configured to partially copy the audio buffer 444b, 452, 454 and use it instead of the original one provided by the audio application sink element 443b. FIG. 4B shows a related audio buffer cut 453;

v. The output pipeline 446a, 446b can be configured to use the application source element 445a, 445b configured with a callback, which is invoked when a new frame 430 needs to be displayed or audio needs to be played. Two application source elements 245a, 245b can serve as audio and video input;

vi. The input pipeline 440a, 440b decodes the video file at higher speed and can jump between segments when needed, meanwhile filling the buffer of frames 430 that serve as input for the output pipeline. The output pipeline 446a, 446b defines timecodes for newly generated frames and signals the input pipeline when to stop or start the decoding in order to avoid overfilling the memory buffer;

vii. This all provides the seamless, uninterrupted playback of segmented media content without the need for resource-intensive re-encoding; and viii. The customizable video playback device 104 needs video and audio buffers to be filled at minimum capacity to start playing the video when user is doing seek or start/stop operations.

Figures 4D, 4E:
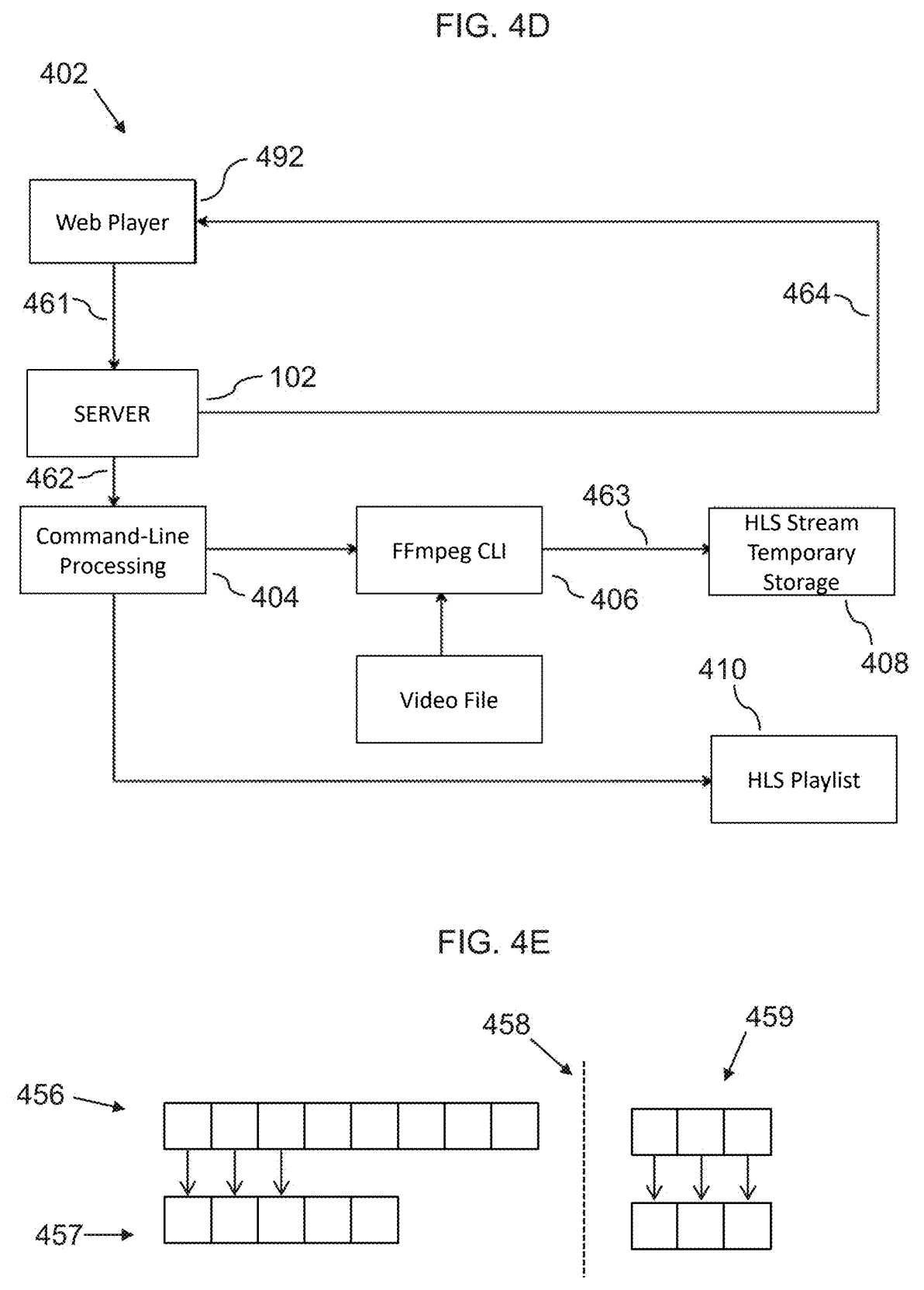

In a second example embodiment 402, as shown in FIGS. 4D and 4E, the customizable video playback system 100 can be implemented as a web-based player 492, such that:

a) An operating platform/tech stack can for example include: C++, ffmpeg, JavaScript, and PHP;

b) The customizable video playback device 104 can be configured to play segment sets seamlessly in a web-based player with support for mobile devices on Android and iOS such that multiple users can use the application at a time; and c) Implementation details can include:

i. When the user 122 wants to start playing a desired segment set, the web player video playback device 104 sends a request that is forwarded to a command line utility which generates a HLS stream from the video file and sends 464 a pre-generated HLS playlist to the web player. On each seek action, the video playback device 104 re-generates the HLS playlist 410 as there is no certain information to determine at what stage of encoding the stream is in. HLS chunks are stored in a temporary folder and cleared upon user disconnect. A Cron job can erase the generated stream for the user that disconnected. Thus:

1. The web player 492 can send a play request 461 to the server 102, to request start playing from a desired position;

2. The server 102 can send a preparation request 462 to the command-line utility 404, which includes a set of commands to prepare the HLS stream;

ii. A FFmpeg utility 406 can generate a separate stream for each OS (Android, iOS) because of differences in players for these platforms, such that the FFmpeg utility 406 generates HLS chunks that are sent 463 to HLS stream temporary storage 408 iii. The web player video playback device 104 can be configured to allows a user 122 to play any segments sets without keeping multiple copies of the video files. The disadvantage of this approach is very high CPU load because of the running FFmpeg utility, and a substantial amount of free space needed to keep temporary generated HLS chunks, if multiple users want to play segments set, which affect efficient horizontal scalability to large groups of users 122; and iv. wherein FIG. 4E shows encoded HLS chunks 456 and player loaded chunks 457; where after a use does a seek 458, the player 492 waits 459 until the stream is generated starting from the desired position.

In a third example embodiment, the customizable video playback system 100 can be implemented as an enhanced web-based player, such that:

a) An operating platform/tech stack can for example include: React.js and PHP;

b) The customizable video playback device 104 is configured to use the same scheme as in the second embodiment 402, but for each segment there are pre-generated HLS playlists stored on the server, which reduces CPU load and usage of temporary files, but may not be space efficient if the segment is modified by just adjusting the threshold for the segments to get included; and c) Implementation details include:

i. For each operating system, the customizable video playback device 104 is configured to generate an HLS stream with its own settings, which may be space inefficient. In this third example embodiment, the user 122 may not be able to control thresholds for the segments manually.

Figure 4F:
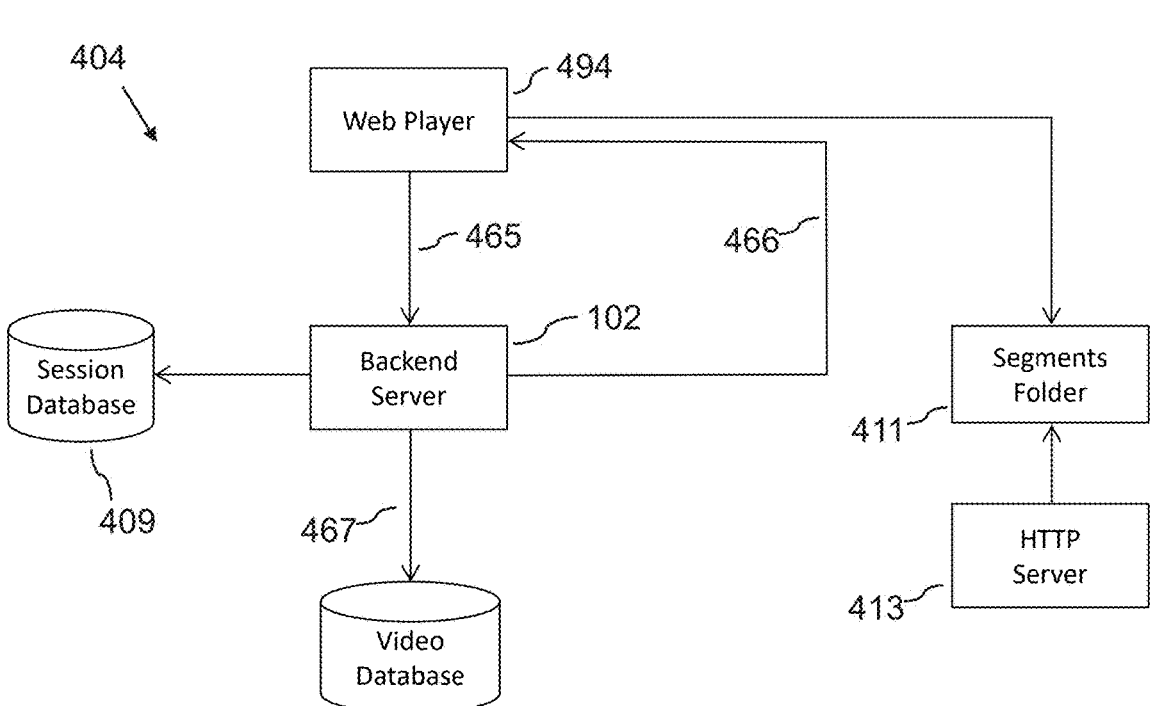
FIG. 4F is a fourth example embodiment of a customizable video playback system implemented as an enhanced web-based player, according to an embodiment of the invention.
Figure 4G:
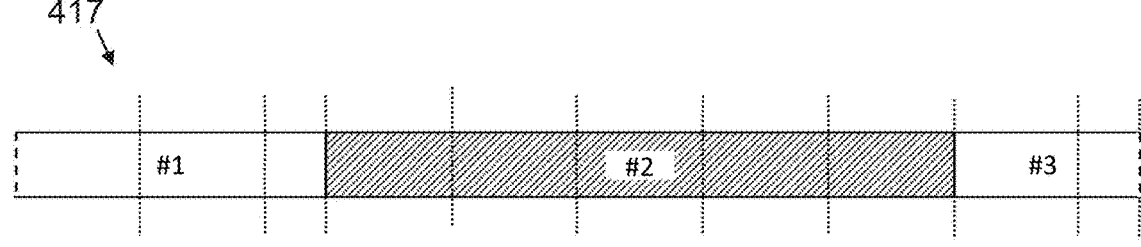
FIG. 4G is a schematic diagram illustrating a HLS chunk after filtering in the second example embodiment of a customizable video playback system, according to an embodiment of the invention.

In a fourth example embodiment, as shown in FIGS. 4F and 4G, the customizable video playback system 100 can be implemented as a further enhanced web-based player 494, such that:

a) An operating platform/tech stack can for example include: React.js, Node.js, FFmpeg, REDIS™ in memory NoSQL database, AMAZON™ AWS™; and b) Implementation design implements significant enhancement to the third example embodiment, including:

i. Generation of HLS stream for the full segments set and then request playback with specified threshold by processing threshold change requests 465 to provide 466 adjusted HLS playlist for the web player 494. This saves CPU time and does not require extra disk space for pre-generated streams for each segment set, which can be acquired from the full HLS stream by just changing the threshold;

ii. Segment set can be very big and can include thousands of entries. Because processing of segments set can be too CPU intensive for local JavaScript execution on the web player 494, it can be moved to processing on the backend server 102. On each update of the threshold web page, the web player 494 sends a request to the backend server 102 with user parameters and receives a new HLS playlist which is loaded into the web player 494;

iii. The customizable video playback device 104 requires the HLS stream to be prepared such that along with splitting the video into chunks, such that playback follows boundaries of segments defined by the summarization algorithm;

iv. Since the first frame of each segment contains a key frame, the customizable video playback device 104 can be configured to compose segments into the playlist in any order. When composing HLS playlist, the customizable video playback device 104 relies on a set of segments and algorithm to filter them out. Once the user changes the settings, the customizable video playback device 104 runs the algorithm again and obtains a new playlist which will be loaded onto the customizable video playback device 104 and available to the user 122;

v. FIG. 4G shows an example of filtered chunks 417 within a filtered sequence of segments, wherein first and third segments #1 are included, and a second segment is excluded;

vi. Presets are prepared and can be stored on a HTTP server 413 in a segments folder 411 with pre-generated chunks for all segments, via web-based player 494 direct access to the segments folder 411. Each preset includes a set of chunks for HLS playback and a special text (JSON) file containing a list of segments with the information needed for generation of playlist with parameters specified by the user;

vii. Player user session information used for calculations is stored in the REDIS™ session database 409;

viii. The player 494 can read a template for a specified video via direct lookup 467 in the video database 210;

ix. The operating environment allows multiple users to play the same or different presets at the same time and is highly horizontally-scalable to serve very substantial pluralities of users 122 simultaneously; and x. The web player 494 video playback device 104 can be configured to support both desktop and mobile platforms.

In related embodiments, further Improvements of the video playback device 104 of the customizable video playback system 100 can include:

a) Decentralizing all processing to a web player or a native application player component, significantly enhancing the extensibility of the solution by eliminating the need for backend processing;

b) While the file structure remains unchanged, pre-generated segments can be configured to persist on the server, seamlessly employed by the player for playlist composition;

c) Solution of the web player can utilize WASM technology that empowers web pages to execute the code in an efficient way which should address potential JavaScript CPU challenges when working with very large text files (files containing segment data) for HLS playlist generation;

d) For mobile devices, there can be two native applications for Android and iOS platforms using native multimedia SDKs to play HLS video streams. Processing playlists also can be done on mobile devices, which will give users much more flexibility in composing video content and eliminate the need for backend processing; and e) There can be native applications for home streaming devices, such as ROKU™ streaming boxes, and smart televisions. Processing playlists also can be done on home streaming devices, which also will give users much more flexibility in composing video content and eliminate the need for backend processing.

Finally, in a fifth example embodiment, the customizable video playback system 100 can be implemented as a yet further enhanced web-based player, such that:

a) An operating platform/tech stack can for example include: WebAssembly (WASM);

b) The objective for this player is to decentralize all processing to the web player component, significantly enhancing the extensibility of the solution by eliminating the need for backend processing; and c) Implementation details can include:

i. While the file structure remains unchanged, pre-generated segments can be configured to persist on the server, seamlessly employed by the player for playlist composition; and ii. WASM technology empowers web pages to execute the code efficiently, which may address potential JavaScript CPU challenges when working with very large text files (files containing segments data) for HLS playlist generation.

In a related embodiment, have an HLS-based web player can serve video in different qualities (e.g., 320p, 480p, 720p) or different compression levels (e.g., 20%, 30%, etc.). Rather than recalculating every segment each time the user changes settings, the system dynamically builds or reuses existing HLS manifests based on information stored in a cache, such as a the REDIS™ session database 409. Main function of the HLS-based web player can include:

a) Frontend Requests:

i. The player sends an API request to the backend when it first loads a stream (e.g., for a specific compression level or quality);

ii. Once the initial stream is generated, switching compression or quality triggers a new API request, but the backend can reuse cached information to avoid reprocessing all segments;

b) Backend Caching in REDIS™ Cache:

i. When the backend first calculates which segments to include or skip, it creates a Master HLS draft and stores that in Redis along with an identifier (the masterId);

ii. Each HLS draft includes references to segment files, but uses a placeholder (% quality %) so the same draft can quickly be adapted to different output qualities;

c) Master Stream Generation:

i. The first API call (e.g., /api/hls/process) filters segments based on user settings and compression logic, then creates a master playlist (manifest) that points to sub-playlists for each quality;

ii. This master playlist is cached in the REDIS™ Cache and identified by masterId;

iii. Example of a master playlist entry:

```
<Example Begin>
#EXT-X-STREAM-INF:BANDWIDTH=110000
https://.../api/hls/stream?masterId=1319985c57fdf&quality=320#E
```

-continued

```
XT-X-STREAM-INF:BANDWIDTH=200000
https://.../api/hls/stream?masterId=1319985c57fdf&quality=480
<Example End>;
``` wherein the system only needs to do the full segment filtering and creation once per unique combination of preset and compression setting;

d) Sub-Stream Requests for Specific Qualities:

i. A second request (e.g., /api/hls/stream?masterId=1319985c57fdf&quality=320) uses the already cached master HLS draft;

ii. The server replaces the % quality % placeholder in each segment URL with the requested quality (e.g., 320);

iii. This means the server doesn't have to re-filter or re-check every segment; it simply returns a new, ready-to-play HLS manifest pointing to the correct files in the correct folder;

e) Practical Example:

i. The cached HLS draft can for example be configured as:

```
<Example Begin>
#EXTM3U
#EXT-X-MEDIA-SEQUENCE:0
#EXT-X-ALLOW-CACHE:NO
#EXT-X-VERSION:3
#EXT-X-TARGETDURATION:11
#EXTINF:2.9696,
https://.../%quality%/output_0.ts
#EXT-X-DISCONTINUITY
#EXTINF:2.7027,
https://.../%quality%/output_1.ts
#EXT-X-DISCONTINUITY
<Example End>;
``` wherein discontinuity tags are used because original stream is broken into chunks and there can be big gaps between them in the timeline. However, new timestamps are not generated for each chunk; and ii. When the player requests quality=320, the server replaces % quality % with 320, such that the script code becomes:

```
<Example Begin>
#EXTM3U
#EXT-X-MEDIA-SEQUENCE:0
#EXT-X-ALLOW-CACHE:NO
#EXT-X-VERSION:3
#EXT-X-TARGETDURATION:11
#EXTINF:2.9696,
https://.../320/output_0.ts
#EXT-X-DISCONTINUITY
#EXTINF:2.7027,
https://.../320/output_1.ts
#EXT-X-DISCONTINUITY
<Example End>;
``` and f) Additional Comments:

i. Currently compression levels are limited to a discrete set (e.g., 20%, 30%, 50%, etc.). In that scenario, precomputing results for each possible compression setting could further reduce real-time calculations, but it depends on how many distinct settings are offered. The current "on-demand" approach remains flexible for any compression setting from 0 to 100.

In a related embodiment, a segmentizer player can be configured such that:

a) The Segmentizer defines the boundaries of dialogue and shot segments in a video, then assigns significance values to the segments. Any new versions of the video created by the Segmentizer can be reviewed and modified within the application. When a new video version is created and finalized, the Segmentizer generates a JSON (JavaScript Object Notation) file for import into the reaming player to set up for interactive streaming; and b) The JSON file lists all segments, with key data and rules that describe and govern each segment. These parameters dictate the boundaries for chunk splitting. If the segment is identified as a shot segment, then that chunk will be divided into multiple sub-chunks. The header of the JSON file sets the parameters of the player engine, which is a simplified version of the playback control side of the Segmentizer application. The player engine algorithm responds to user commands to select the chunks to be played.

In a further related embodiment, with respect to generation of video chunks 591:

a) DX segments can be split into chunks with a maximum duration that is defined for this type of HLS stream. By default, the maximum duration can be 10 seconds; and b) SHOT segments can be split into a plurality of chunks, such as 5, 10, 15, or 20 chunks each, because trim threshold is applied to these types of segments. If after dividing by the corresponding plurality of chunks the duration of one chunk is less than 5 frames, then 5 frames can be used as the minimal duration.

In another further related embodiment, with respect general rules for all types of segments:

a) Borders of one segment are not crossed when generating chunks. Data is saved about all generated chunks for the segment and this data is used later to generate HLS playlist for the player depending on parameters set and passed by the player; and b) When the web player receives a request from the user to change the significance threshold it sends a request to the backend to calculate a new HLS playlist based on parameters. The Player doesn't work with the segments directly and doesn't know anything about them, nor does it know of the filtering algorithm. Under the hood we apply filtering of segments is applied on the backend side and all contained chunk files are collected. The list then returned as an HLS playlist to the web player.

In another further related embodiment, with respect to use of WASM (WebAssembly):

a) An idea behind the use of WASM is to make the player backend independent as much as possible, which helps with easy integration of this player on different platforms if needed. Currently, for each change of significance threshold a new request I sent to the backend service to return a new HLS playlist after the backend service applies the filtering. It is done because of the slow calculation powers of JavaScript as very large JSON files are process with substantial calculations to apply the filtering each time; and b) With WASM, in conjunction with powerful languages like C++ or Rust, processing of segments can be moved directly to the player and the player would generate HLS playlists on its own depending on user requests. It means the player won't need a backend service after it receives a JSON file with the segments in the defined format.

In various embodiments, potential applications and use cases of the customizable video playback system 100 can include:

a) Content Summarization:
Automatically generate concise summaries of lengthy videos, making it ideal for news outlets, content creators, and educational platforms;

b) Personalized Video Playback:
Enable users to customize their video-watching experience by extracting specific elements, such as focusing on individual characters or scenes.

c) Accessibility Features:
Enhance accessibility for individuals with visual or hearing impairments by extracting and presenting key visual and audio content;

d) Video Editing and Production:
Streamline the video editing process by easily extracting desired scenes or phrases for content creators and filmmakers;

e) Automated Content Tagging:
Automate the process of content tagging by extracting and categorizing specific events within videos;

f) Educational Platforms:
Enhance educational content by allowing educators to pinpoint and emphasize specific educational elements within videos;

g) Live Streaming Enhancements:
Improve live streaming experiences by dynamically highlighting key moments based on user preferences or contextual relevance; and h) Social Media Sharing:
Simplify the process of sharing personalized video clips on social media platforms, allowing users to highlight and share their favorite moments.

The adaptability of the customizable video playback system 100 makes it suitable for a wide range of applications, revolutionizing how users interact with and extract meaningful content from videos across diverse industries.

Figure 5A:
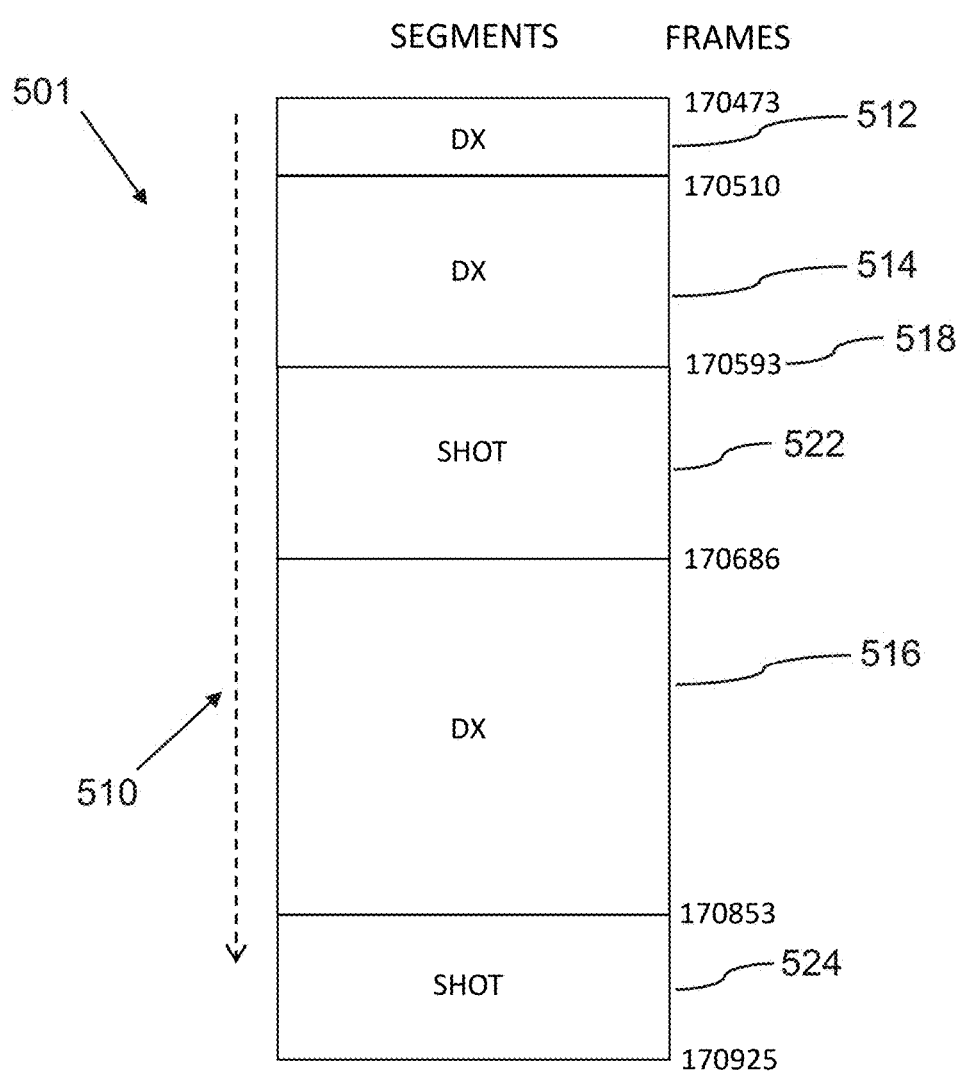
FIG. 5A is a schematic diagram illustrating a video timeline separated into DX segments and SHOT segments, according to an embodiment of the invention.

In a related embodiment, as shown in FIG. 5A, the dynamic index file 310 can be configured as a dynamic index file data structure 501, such that:

a) Video content can be analyzed by the summarization algorithm, which establishes boundaries dividing the video content into DIALOGUE (DX) segments 512, 514, 516 and NON-DIALOGUE (NON-DX) segments;

b) wherein DX segments 512, 514, 516 are defined by and comprise at least one spoken sentence;

c) NON-DX segments comprise all visual and audio information that exists between each DX segment 512, 514, 516;

d) NON-DX segments are divided into SHOT segments 522, 524. A shot is defined as continuous film footage or cinematic sequence between two edits or cuts; and e) The start frame and end frame of each DX and SHOT segment is recorded and stored in the segment metadata.

In a related embodiment, as shown in FIG. 5A, a video timeline 510 can be separated into DX segments 512, 514, 516 and SHOT segments 522, 524. The start frames 518 of each segment 512, 514, 516, 522, 524 are displayed on the right side of FIG. 5A.

In a further related embodiment, the summarization algorithm can be configured to calculate a significance value for each segment based on the content metrics. Dialogue significance is based on the calculation of significance values for the speaking people or characters in the video, word statistics of the sentences, concept statistics mined from the sentences, and other factors. There is usually visual information occurring during DX segments 512, 514, 516, but the transcribed sentence audio of the DX segment 512, 514, 516 takes priority over the visual information in the calculation of the significance value of the DX segment 512, 514, 516. The visual information of a DX segment 512, 514, 516 may assist in the identification of the speaker of each sentence which, in turn, assists in the calculation of character significance values. The visual information also assists in solving pronoun/antecedent relationships which, in turn, assists in the calculation of character significance.

In another further related embodiment, the customizable video playback device 104 can be configured to calculate a shot significance is based on the calculated significance value for the people or characters and their appearance in the shots, and other visual factors. There may usually be audio information occurring during a SHOT segment, but the visual information takes priority over the audio information in the calculation of the significance value of the SHOT segment. The audio information of a SHOT segment may assist in the calculation of the shot significance value. The audio information may assist in the identification of the most significant portions of a shot, which determines how much to trim the less significant portions of the shot.

Figure 5B:
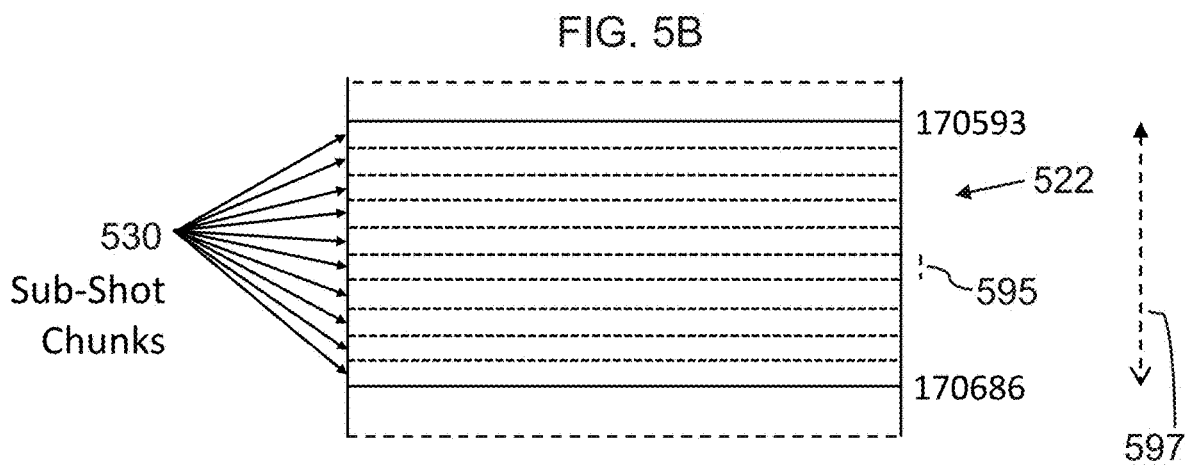
FIG. 5B is a schematic diagram illustrating a sequencing of sub-shot chunks of a video timeline, according to an embodiment of the invention.
Figure 5D:
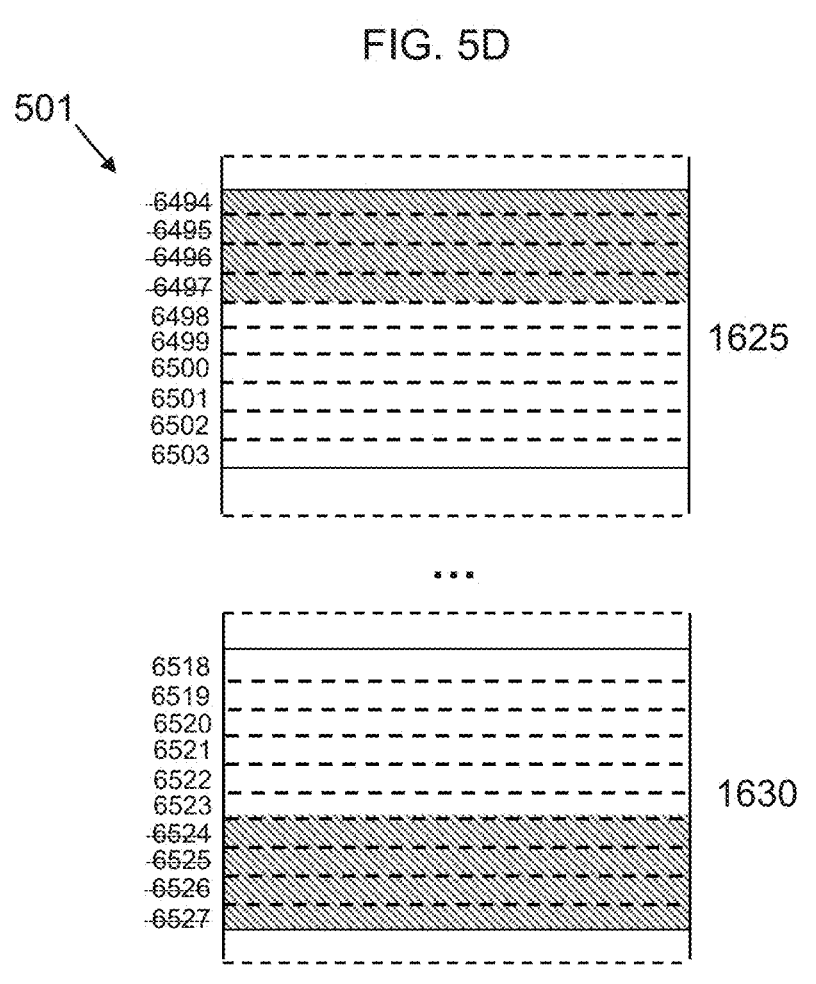

In a related embodiment, as shown in FIG. 5B, the preparation of the streaming video chunks begins with the embedding of frame accurate reference in the overall long-play video. The frame boundaries of each segment 522 are searched and located. In the case of DX segments, the video is chunked based on the start frame location and the end frame location of each defined DX segment. In the case of SHOT segments, the start frame location and end frame locations are found, and each SHOT segment is divided and chunked into multiple sub-shot chunks 530.

In a further related embodiment, the streaming viewer may select or change a parameter that prompts the summarization algorithm to change the length of the overall video by skipping certain segments. The algorithm populates the dynamic index file 310 with a list of chunk numbers that will be played, the unprovided chunk numbers will therefore be skipped. Because the first frame of each chunk is a keyframe, all chunk transitions will be smooth and maintain the integrity of the interframe prediction video compression.

In another further related embodiment, FIG. 5C shows a sequence 503 of DX and SHOT segments. To the right of each segment is a line of segment data that includes the start and end frame, segment significance value, and whether the segment is included in the customized streaming view. SHOT segment 1627 and DX segments 1623, 1628, and 1631 and are not included in the view because their significance values fall below a threshold.

Figure 5E:
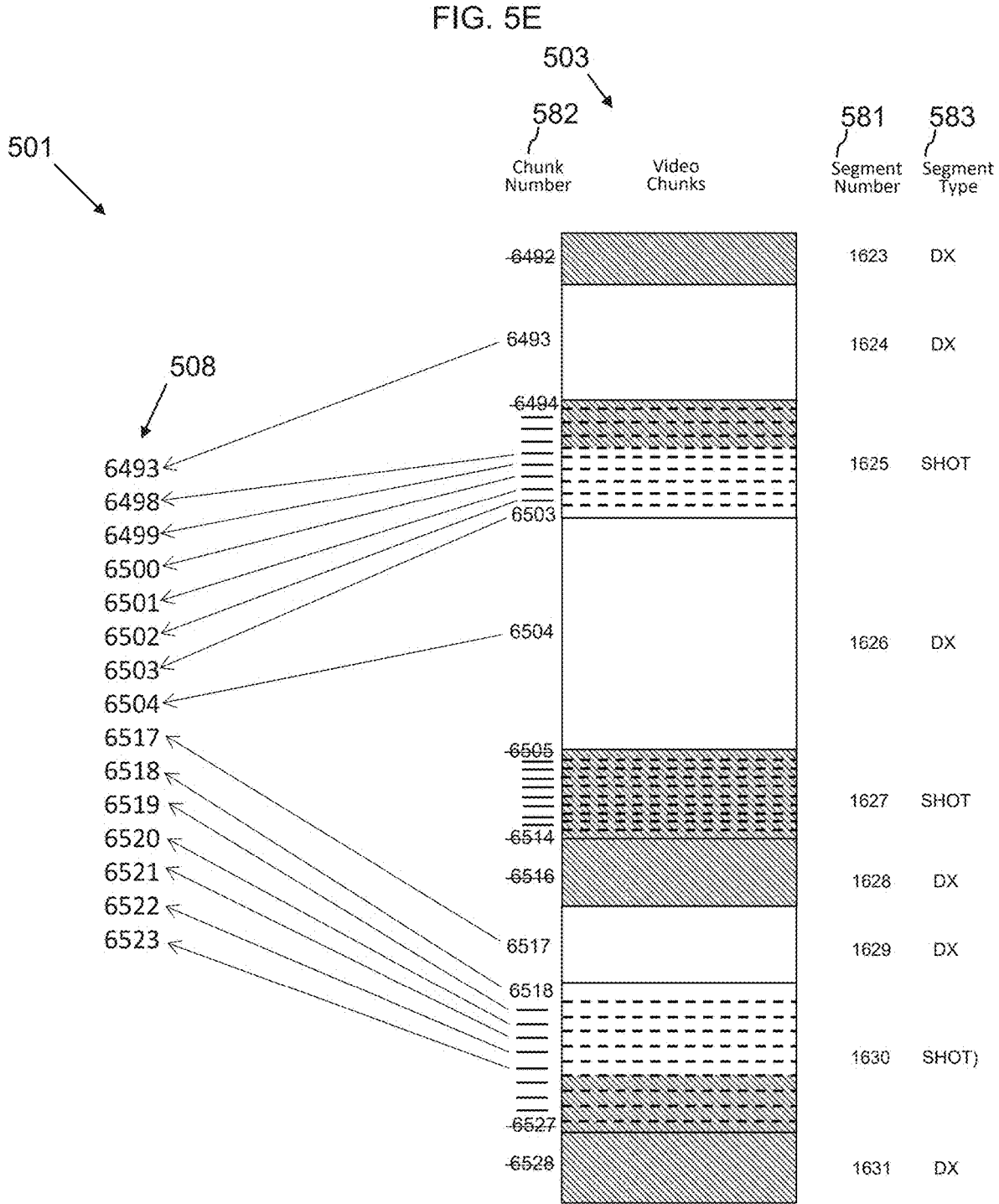
FIG. 5E is a schematic diagram illustrating a final chunk list of a dynamic index file, according to an embodiment of the invention.

In this example embodiment, SHOT segments 1625 and 1630 are included in the view, but some of the sub SHOT segments are not included because the shots are being trimmed of less significant information based on significance threshold filtering, wherein:

a) As shown in FIG. 5D, shot 1625 is being trimmed from the front of the shot and shot 1630 is being trimmed from the end of the shot; and b) FIG. 5E illustrates the final chunk list 508 that would populate the dynamic index file 501 in this limited example. All the video chunks 591 not appearing in the final list will be skipped in the streaming view.

Thus, in related embodiments, the variable length video chunks 591 can be configured with unique and meaningful time-length based segmentation boundaries of visual and audio events contained in the selected source video 214, such as dialogue segment boundaries, shot segment boundaries, and sub-shot segment boundaries.

Further, in various related embodiments, characteristics of the system for customizable video playback 100 can include:

a) Chunks can be defined to begin and end based on the segment boundaries of events on the video itself, which enables the protocol to achieve meaningful frame-accuracy without weighing down the video codec with markers on every frame. This provides an advantage that current random, equal-length chunks cannot accomplish in a scalable manner: frame accurate control of important picture events such as scene and shot boundaries, herein frame accurate control over crucial sound boundaries, especially spoken sentences;

b) Variable-length chunks ensure edited playback of segmented narrative video is perceived as smooth, because spoken dialogue is not forced to start at the beginning of a sentence and stop at the end of a sentence, in contrast to conventional random chunks;

c) Segments can be directly associated with metadata, such as time code values for their boundaries, dynamic significance values, text of a spoken sentence, the speaking character, associated characters-words-concepts all with dynamic significance values, sound level measurements, etc. Chunks, on the other hand, only have a file name;

d) In the Segmentizer player application, segments and their metadata are applied to dynamic parameters and rules to create the chunks. The timecode metadata determines at what points the source video is chopped into chunks that will persist on the server;

e) The player application uses the Segment metadata to select which chunks will be played and which chunks will be skipped based on individual user-controlled parameters; and f) A chunk is a simple dumb object with only a name, so chunk control doesn't require any processing for playback other than having the chunk name called, then the chunks simply stack into the playback buffer in the order that they are called.

In summary, in a related embodiment, as shown in FIGS. 5C and 6C, a dynamic index file 310 can include:

a) An ordered segment list 570 of segments 580, wherein each corresponding segment 580 in the ordered segment list 570 of segments 580 can include:

i. a segment number 581;

ii. an ordered chunk list 560 of at least one index chunk number 582, which can be a plurality of chunk numbers 582;

wherein each chunk number 582 corresponds to a corresponding variable length video chunk 591 of the source video 214 with the same (i.e. matching) source chunk number 622;

iii. a segment type 583, which can be selected from a type set including DX (a dialogue type) and SHOT (a non-dialogue type shot segment);

iv. a start frame number 584, which corresponds to a start frame of the segment 580 in the corresponding selected source video 214;

v. an end frame number 585, which corresponds to an end frame of the segment 580 in the corresponding selected source video 214;

vi. a trim percentage 586, which defines the proportion of the segment 580 that has been removed (i.e. deselected) for playback;

vii. a segment length 587, which can for example be measured in number of frames;

viii. a segment significance 588, which can for example be a numeric value, as shown; or an ordered symbolic value; and ix. a segment included flag 589, which is a binary flag to denote if the segment 580 is selected as part of the customized video 314.

In a further related embodiment, the customizable video playback device 104 can be configured to play each corresponding segment 580 in the ordered segment list 570 in a segment order of the ordered segment list 570 (i.e., the segments 580 are played in sequence according to the ordering/sequencing of the ordered segment list 570), such that the video playback device 104 for each corresponding segment 580 is configured to play each corresponding variable length video chunk 591 corresponding to a corresponding chunk number 582 in the ordered chunk list 560 in a chunk order of the ordered chunk list 560 (i.e., for each segment 580, the video chunks 591 are played in sequence according to the ordering/sequencing of the ordered chunk list 560).

In some embodiments, the corresponding variable length video chunk 591 can be stored in the video database 210 and accessed by reference via the index chunk number 582, or other cases a copy of the corresponding variable length video chunk 591 may be stored locally on the customizable video playback device 104 in a local database (which can be a partial replicate of the video database 210) or in the dynamic index file 310.

In a further related embodiment, the ordered segment list 570 of segments 580 of the dynamic index file 310 can be a truncation and/or reordering of the ordered sequence 620 of segments 580 of the source video 214; and the ordered chunk list 560 of at least one index chunk number 582 can be a truncation and/or reordering of the ordered sequence 590 of corresponding video chunks 591, 592, 594 of the source video 214, which can facilitate an editing and resequencing of the source video 214 into the customized video 314. Thus, in an alternative description, the ordered segment list 570 of segments 580 of the dynamic index file 310 can be a permutation of the entire ordered sequence 620 of segments 580 of the source video 214 or a permutation of a subset thereof; and the ordered chunk list 560 of at least one index chunk number 582 can be a permutation of the entire ordered sequence 590 of corresponding video chunks 591, 592, 594 of the source video 214 or a permutation of a subset thereof.

In a further related embodiment, the selected video chunks 591 can each be separately configured with an independent variable length 595, which is based on the segment length of a corresponding segment 580, such that an aggregated length 597 of each video chunk 591 in the ordered chunk list 560 of at least one chunk number 582 is equal to the segment length 587;

such that the selected video chunks 591 are variable length video chunks 591, such that the variable length video chunks 591 can be configured to enable a chunking of the selected source video 214 and the customized video 314 without any variable length video chunk 591 overlapping between successive segments 580.

In another further related embodiment, the dynamic index file 310 can be configured such that:

a) at least one first segment 580 in the ordered segment list 570 of segments 580 can be configured with a first segment type 583 of dialogue type and the ordered chunk list 560 of the at least one index chunk number 582 is a single-element ordered chunk list 560 of one chunk number only 582, which corresponds to a dialogue video chunk 591 of a corresponding dialogue segment 580; and b) at least one second segment 580 in the ordered segment list 570 of segments 580 can be configured with a second segment type 583 of non-dialogue type and the ordered chunk list 560 of the at least one index chunk number 582 is a is a multiple-element ordered chunk list 560 of a plurality of chunk numbers, which each correspond to a non-dialogue video chunk 591 of a corresponding non-dialogue segment 580.

In a related embodiment, as shown in FIG. 6B, an object data structure 650 for an object 224 in the object database 220 can include:

a) An object id 651;

b) An object name 652;

c) An object description 653;

d) An object type 654, which can be selected from the group comprising:
    i. a person;
    ii. a character (such as an animated character);
    iii. a physical object; and
    iv. a concept;

e) An object significance 655, which can be a numeric value;

f) A plurality 636 of object image samples 656, or at least one object image sample 656, which depicts the object 224; and g) A plurality 637 of voice samples 657, or at least one voice sample 657, which each are a voice sample 657 of the object 224.

Figure 8:
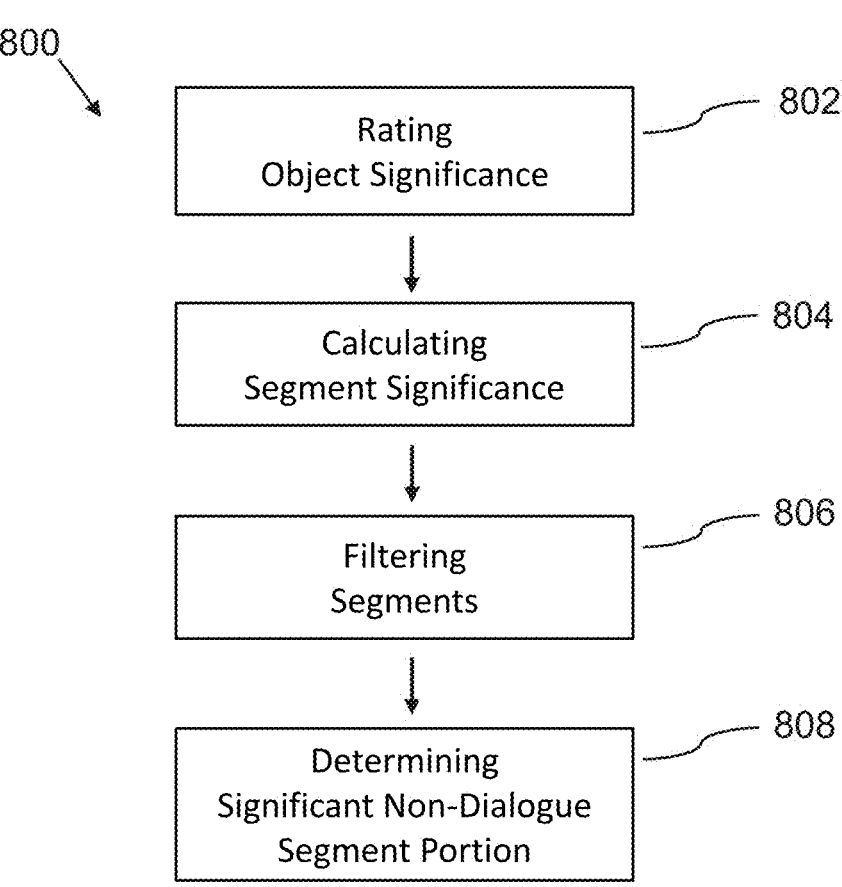
FIG. 8 is a flowchart illustrating steps that may be followed, in accordance with one embodiment of a method or process of segment significance calculation.

In a further related embodiment, as shown in FIG. 8, a segment significance calculation process 800 for calculating a segment significance 588 of a segment 580 in a source video 214 can include:

a) Rating object significance 802, wherein objects including people (characters), words, physical objects, and concepts are rated based on their number of mentions or appearances on screen in the entire source video 214;

b) Calculating segment significance 804, where a significance value is calculated for each segment based on the combined ratings of the people (characters), words, physical objects, and concepts that are referenced in the segment, wherein the segment can be a dialogue segment or a shot segment;

c) Filtering segments 806, wherein segments are filtered out by setting the corresponding segment included flag 589 to false, when a corresponding segment significance value is below a predetermined significance threshold; and d) Determining a shot significant segment portion 808, wherein a most significant portion of a shot non-dialogue segment is determined based on sound level, motion speed, character appearance, and physical object appearance, such that the least significant portions of the segment can be prioritized for trimming as the significance threshold is lowered. In most embodiments, Dialogue segments are not trimmed (so are not split into a plurality of smaller chunks, such as 20 chunks), but instead are associated with one chunk only.

In further related embodiments, a dynamic weighting can be applied to a calculated segment significance 588, for example based on configurable or user determined dynamic criteria.

In yet a further related embodiment, the playback manager 230 can be configured to calculate a segment significance 588 for each segment 580 in the source video 214, such that the segment significance 588 can be calculated as an aggregated sum of object significances 655 for each corresponding object 224, such as a person or character, appearing in corresponding variable length video chunks 591 associated with the segment, wherein the corresponding object 224 is stored in the object database 220; such that the playback manager 230 can be configured to execute an object recognition algorithm 231, wherein:

a) the playback manager 230 can be configured to execute an image detection algorithm 232 to determine a set of detected objects 224 (such as human faces and cartoon character faces) in the corresponding variable length video chunks 591 associated with the segment 580 and then subsequently execute an image recognition algorithm 234 for each detected object 224 against the object database 220, such that a corresponding object significance 655 is added to the aggregated sum 588 of object significances 655 for the segment 580, for each recognized object 224 in the set of detected objects 224; wherein:

i. the image detection algorithm 232 can be based on well-known methods for image detection, including Haar Cascades, Scale-invariant feature transform (SIFT), Histogram of oriented gradients (HOG), Region-based Convolutional Neural Networks (R-CNN), etc.; and can use software library functions, such as OPENCV™ cv2.CascadeClassifier; and ii. the image recognition algorithm 234 can be based on well-known methods for image recognition, including geometric feature extraction, template matching, photo-metric statistical methods; and can use software library functions, such as FACEBOOK™ AI Similarity Search.

In another yet further related embodiment, a preceding object detection stage may be omitted, such that the playback manager 230 can be configured to execute an image recognition algorithm 234 to recognize a set of recognized image objects with a matching object image sample 656 in the corresponding variable length video chunks 591 associated with the segment 580, such that a corresponding object significance 655 is added to the aggregated sum 588 of object significances 655 for the segment, for each recognized image object 224.

In yet further related embodiment, the playback manager 230 can be further configured such that:

a) the object recognition algorithm 231 can be further configured to execute a speaker diarization algorithm 236 to recognize a set of recognized voice objects 224 (such as a recitation of a name or description) with a matching object voice sample 657 in the corresponding variable length video chunks 591 associated with the segment 580, such that a corresponding object significance 655 is added to the aggregated sum 588 of object significances 655 for the segment 580, for each recognized voice object 224; wherein:

i. the speaker diarization algorithm 236 can be based on well-known methods for speaker diarization, including for example Gaussian mixture models combined with Hidden Markov Models; and can use software library functions, such as ALIZE™ Speaker Diarization;

In yet further related embodiments, lines of dialogue can be cross referenced with scripts or subtitles to identify speakers; and for objects that are of type concepts (i.e., wherein the object type 654 is a concept), they can be detected in the spoken dialogue of a video, via the speaker diarization algorithm 236, but can also be supported by visuals.

In a yet further related embodiment, the segment included flag 589 can be set to true, if the segment significance 588 exceeds a predetermined significance threshold; and the segment included flag 589 can be set to false, if the segment significance 588 does not exceed the predetermined significance threshold. The predetermined significance threshold can for example be defined in a configuration file and can further be user adjustable by a user 122.

In a further related embodiment, the customizable video playback device 104 can be configured to play each corresponding segment 580 in the ordered segment list 570 in a segment order of the ordered segment list 570 for all segments with the segment included flag 589 set to true (i.e., the included segments 580 are played in sequence according to the ordering/sequencing of the ordered segment list 570), such that the video playback device 104 for each corresponding included segment 580 is configured to play each corresponding variable length video chunk 591 corresponding to a corresponding chunk number 582 in the ordered chunk list 560 in a chunk order of the ordered chunk list 560 (i.e., for each included segment 580, the video chunks 591 are played in sequence according to the ordering/sequencing of the ordered chunk list 560).

Figure 9:
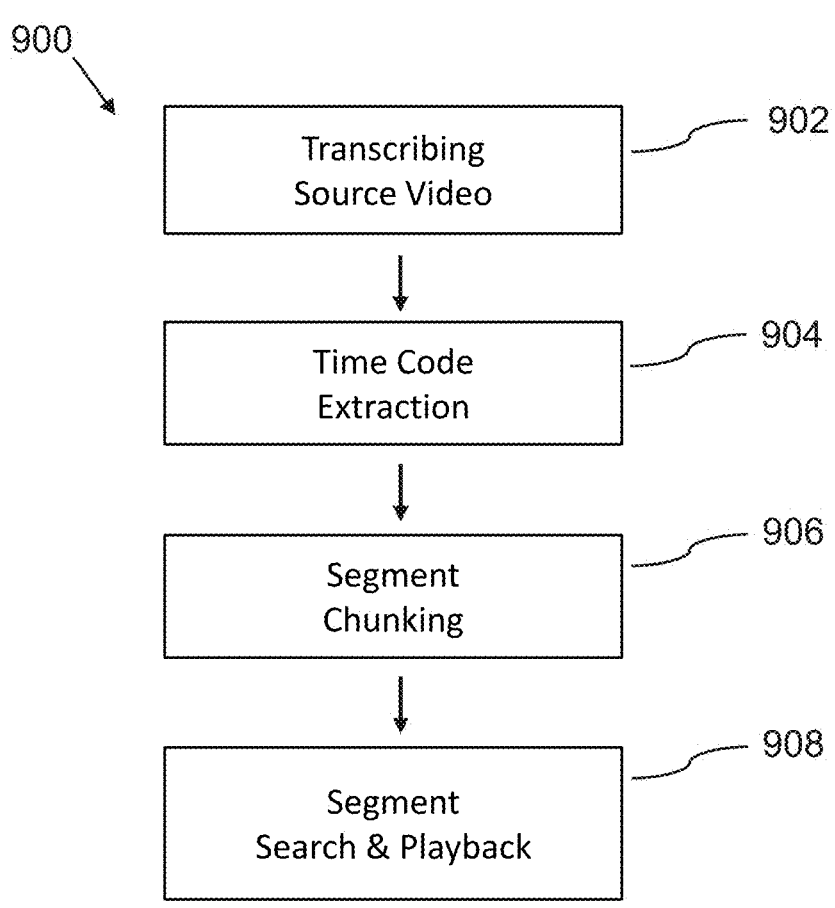
FIG. 9 is a flowchart illustrating steps that may be followed, in accordance with one embodiment of a method or process of customizable video live streaming.

In an embodiment, as shown in FIG. 9, of a customizable video live streaming process 900, video and audio can be recorded for live streaming and the following actions/process steps can occur almost instantly and at a high rate of speed as to be perceived as "real time", comprising:

a) Transcribing a source video 902, wherein audio of the live stream recording is transcribed by a standard AI transcription algorithm;

b) Time code extraction 904, wherein time code values are extracted from the transcript metadata at the beginning and end of each spoken sentence of said transcript, creating a dialogue segment for each sentence; wherein the extracted time code values and the transcribed text become a part of the dialogue segment metadata; and The video and audio content between dialogue segments has no spoken words and is deemed a non-dialogue segment. Time code values are extracted from the transcript metadata at the beginning and end of each non-dialogue segment and become part of the non-dialogue segment metadata;

c) Segment chunking 906, wherein:

i. each segment can be transcoded as a video chunk of the same length as the segment;

ii. During the transcoding process, any segment longer than a set standard length (typically 10 seconds) may be split into multiple equal standard length video chunks until the end time code of the segment is reached. The final video chunk may be shorter than the set standard length. The standard length value may be determined by the administrator of the transcoding process; and iii. During the transcoding process, a non-dialogue segment may be split into multiple equal length or variable length video chunks; wherein, in some embodiments, a music timing algorithm can split the variable length video chunks based on music rhythm timing;

d) Segment search and playback 908, wherein each video chunk, for playback, may be accessed through the dynamic index file by an individual user directly or with algorithmic assistance, by the instigation of a search of segment metadata associated with said video chunk. Segment metadata may include: a file name, a marker, a time code value, the text of a sentence, a word of the text of a sentence, a description of the video or audio contents of the segment, or other items.

Thus, in various related embodiments, the system for customizable video playback 100, including a customizable video playback server 102 and a customizable video playback device 104 configured to using a dynamic index file 310 to process a video summarization algorithm, which can also be referred to as a dynamic content extraction algorithm, which offers a transformative solution to the challenges in video processing. By dividing videos into segments and implementing a sophisticated algorithm within a web player, the customizable video playback system 100 brings about numerous possibilities across various industries. The capability to customize video playback, generate concise summaries, and enhance accessibility opens doors to improved learning experiences, enriched content creation, and interactive storytelling.

An embodiment of the system for customizable video playback 100 can include:

1) A method of providing an HTTP adaptive bitrate streaming protocol comprising a plurality of variable length video chunks 591, each having a unique meaningful length based on the segmentation boundaries of visual and audio events contained in the subject video;

2) The method of embodiment 1, wherein the variable length video chunks 591 are sequenced by a dynamic index file, which is populated by algorithm aided user input; and 3) The method of embodiment 2, further comprising: providing a compressed packetized transport (CPT) stream via an HTTP live streaming (HLS) protocol comprising a plurality of variable length video chunks 591, each having a unique meaningful length based on segmentation of visual and audio events contained in the subject video.

In related embodiments, the customizable video playback device 104 can include configurations as:

a) A web application, executing in a Web browser;

b) A tablet app, executing on a tablet device, such as for example an ANDROID™ or IOS™ tablet device;

c) A mobile app, executing on a mobile device, such as for example an ANDROID™ phone or IPHONE™, or any wearable mobile device;

d) A desktop application, executing on a personal computer, or similar device;

e) An embedded application, executing on a processing device, such as for example a smart TV, a game console or other system.

It shall be understood that an executing instance of an embodiment of the system for customizable video playback 100, as shown in FIG. 1, can include a plurality 114 of customizable video playback devices 104, which are each tied to one or more users 122.

An executing instance of an embodiment of the system for customizable video playback 100, as shown in FIG. 1, can similarly include a plurality of customizable video playback servers 102.

Figure 7:
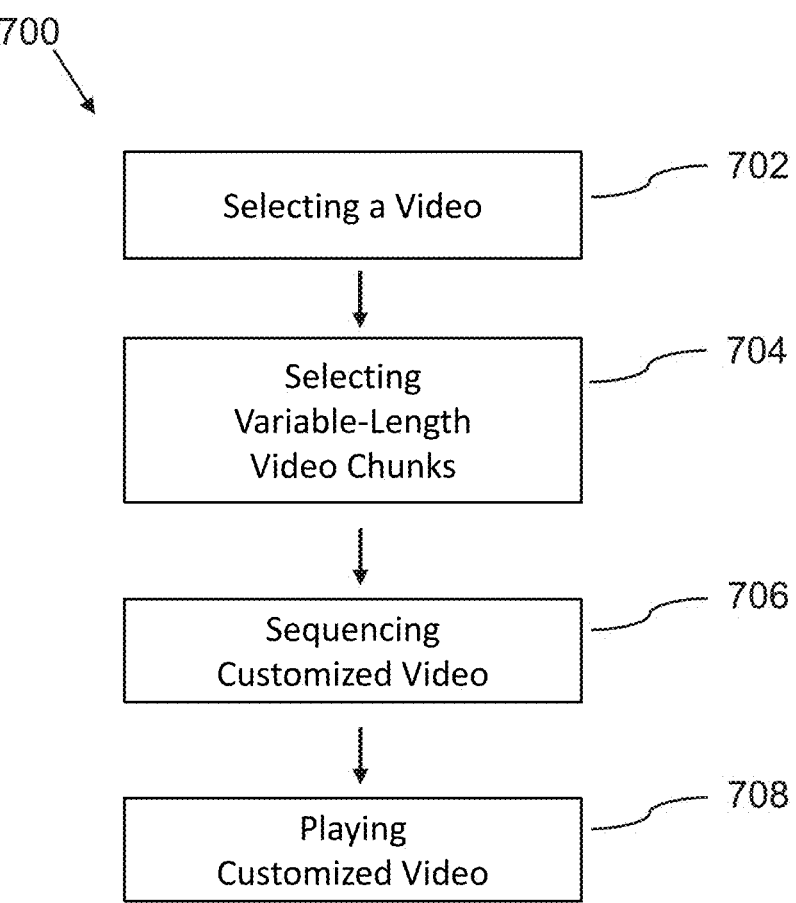
FIG. 7 is a flowchart illustrating steps that may be followed, in accordance with one embodiment of a method or process of customizable video playback.

In an embodiment, as illustrated in FIG. 7, a method for customizable video playback 700, can include:

a) Selecting a video 702, comprising a user 122 using a customizable video playback device 104 to select a source video 214 from a plurality of source videos 214 in a video database 210;

b) Selecting variable-length video chunks 704, comprising the user 122 using the customizable video playback device 104 to select a list of variable length video chunks 591 from the selected source video 214;

c) Sequencing a customized video 706, wherein the variable length video chunks 591 are sequenced by a dynamic index file 310, according to sequencing input from the user 122, to produce the customized video 314; and d) Playing the customized video 708, comprising the user 122 using the customizable video playback device 104 to watch the customized video 314, by playback of the variable length video chunks 591 as sequenced by the dynamic index file 310.

FIGS. 1, 2, and 3 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1, 2, and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 1 shows a depiction of an embodiment of the system customizable video playback 100, including the customizable video playback server 102, and the customizable video playback device 104. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as AMAZON EC2™ or MICROSOFT AZURE™.

It shall be understood that the above-mentioned components of the customizable video playback server 102 and the customizable video playback device 104 are to be interpreted in the most general manner.

For example, the processors 202 302 can each respectively include a single physical microprocessor or microcontroller, a cluster of processors, a datacenter or a cluster of datacenters, a computing cloud service, and the like.

In a further example, the non-transitory memory 204 and the non-transitory memory 304 can each respectively include various forms of non-transitory storage media, including random access memory and other forms of dynamic storage, and hard disks, hard disk clusters, cloud storage services, and other forms of long-term storage. Similarly, the input/output 206 and the input/output 306 can each respectively include a plurality of well-known input/output devices, such as screens, keyboards, pointing devices, motion trackers, communication ports, and so forth.

Furthermore, it shall be understood that the customizable video playback server 102 and the customizable video playback device 104 can each respectively include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the customizable video playback device 104 communicates with the customizable video playback server 102 over a network 106, which can include the general Internet, a Wide Area Network or a Local Area Network, or another form of communication network, transmitted on wired or wireless connections. Wireless networks can for example include Ethernet, Wi-Fi, BLUETOOTH™, ZIGBEE™, and NFC. The communication can be transferred via a secure, encrypted communication protocol.

In various related embodiments, as shown in FIGS. 2 and 3, components of the customizable video playback server 102, and the customizable video playback device 104 can include:

a) Software modules 230, 312, which can include the playback manager 230 and the playback controller 312; wherein the software modules 230, 312 are denoted in FIGS. 2 and 3 by soft/rounded corner rectangles, and wherein the software modules 230, 312 can be defined by computer program instructions for execution by a processor 202, 302. In some embodiments, parts or all of the software modules 230, 312 can be compiled to hardware, such as field-programmable gate array circuits or other programmable logic hardware; and b) Hardware components 202, 204, 206, 302, 304, 306, which can for example include a processor 202, 302, a non-transitory memory 204, 304, an input/output component 206, 306, etc.; wherein the hardware components 202, 204, 206, 302, 304, 306 are denoted in FIGS. 2 and 3 by hard corner rectangles, and can be defined by circuits in silicone and/or other materials and can be mounted on a circuit board. In some embodiment, parts of the Hardware components 202, 204, 206, 302, 304, 306 can be implemented as computer program instructions, including operating system code, such as BIOS code or microcode of programmable controllers.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the customizable video playback system 100, including the customizable video playback server 102, the customizable video playback device 104, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the customizable video playback server 102 and the customizable video playback device 104. The components of the customizable video playback server 102 can be distributed over a plurality of physical, logical, or virtual servers. Parts or all of the components of the customizable video playback device 104 can be configured to operate in the customizable video playback server 102, whereby the customizable video playback device 104 for example can function as a thin client, performing only graphical user interface presentation and input/output functions. Alternatively, parts or all of the components of the customizable video playback server 102 can be configured to operate in the customizable video playback device 104. For example, parts or all of the video database 210 and the object database 220 can be replicated to the customizable video playback device 104, for temporary, long-term, or permanent storage on the customizable video playback device 104.

Many such alternative configurations are readily apparent, and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A customizable video playback system, comprising:
(a) a customizable video playback server, comprising:
a video database, which is configured to store a plurality of source videos; and
(b) a customizable video playback device, comprising:
a dynamic index file, which is configured to sequence selected video chunks from a selected source video in the video database;
wherein the customizable video playback device is configured to enable a user to select the selected source video from the plurality of source videos in the video database of the customizable video playback server;
wherein the customizable video playback device is configured to enable the user to select the selected video chunks from the selected source video;
such that the selected video chunks are sequenced by the dynamic index file, according to sequencing input from the user, to produce a customized video, which is a customization of the selected source video based on sequencing of the selected video chunks, according to the dynamic index file;
wherein each source video in the plurality of source videos of the video database comprises an ordered sequence of segments, wherein each corresponding segment comprises:
an ordered sequence of corresponding video chunks, wherein each video chunk comprises:
a chunk number; and
an ordered sequence of video frames, wherein each video frame further comprises:
a frame number;
wherein each video chunk in the ordered sequence of corresponding video chunks comprises a variable number of video frames, such that the ordered sequence of corresponding video chunks comprises variable length video chunks;
such that the corresponding video chunks are each separately configurable with an independent variable length, which is based on a segment length of the corresponding segment, such that an aggregated length of all video chunks in the ordered sequence of corresponding video chunks is equal to the segment length; whereby the variable length video chunks enable chunking of corresponding segments of the selected source video and the customized video, without any variable length video chunk overlapping between successive segment;
wherein the dynamic index file comprises an ordered segment list of segments, wherein each corresponding segment in the ordered segment list of segments comprises:
a segment number; and
an ordered chunk list of at least one chunk number, wherein each chunk number corresponds to a corresponding variable length video chunk of the source video;
wherein each segment in the ordered segment list of segments further comprises:
a segment type, which is selected from a type set, which comprises a dialogue type and a non-dialogue type;
wherein at least one first segment in the ordered segment list of segments is configured with a first segment type of dialogue type and the ordered chunk list of the at least one chunk number is a single-element ordered chunk list of one chunk number only, which corresponds to a dialogue video chunk of a corresponding dialogue segment; and
wherein at least one second segment in the ordered segment list of segments is configured with a second segment type of non-dialogue type and the ordered chunk list of the at least one chunk number is a multiple-element ordered chunk list of a plurality of chunk numbers, which each correspond to a non-dialogue video chunk of a corresponding non-dialogue segment;
such that the customizable video playback device is configured to play the customized video.

2. The customizable video playback system of claim 1, wherein the customizable video playback server further comprises:
(a) a server processor;
(b) a server non-transitory memory;
(c) a server input/output component; and
(d) a playback manager, which is configured to retrieve and process videos from the video database; all connected via
(e) a server data bus.

3. The customizable video playback system of claim 1, wherein the customizable video playback device further comprises:
(a) a device processor;
(b) a device non-transitory memory;
(c) a device input/output component; and
(d) a playback controller, which is configured to play the selected video chunks from the selected source video; all connected via
(e) a device data bus;
wherein the playback controller is configured to enable the user to select the selected source video from the plurality of source videos in the video database of the customizable video playback server;
wherein the playback controller is configured to enable the user to select the selected video chunks from the selected source video;
wherein the playback controller is configured to create and update the dynamic index file, based on the sequencing input from the user.

4. The customizable video playback system of claim 1, wherein the customizable video playback device is configured to play each corresponding segment in the ordered segment list in a segment order of the ordered segment list, such that the video playback device for each corresponding segment is configured to play each corresponding variable length video chunk corresponding to a corresponding chunk number in the ordered chunk list in a chunk order of the ordered chunk list.

5. The customizable video playback system of claim 1, wherein the customizable video playback server further comprises:

an object database, which comprises a plurality of objects, each comprising:

an object significance; and a playback manager, which is configured to retrieve and process videos from the video database;

wherein each segment in the ordered segment list of segments further comprises:

a segment significance;

wherein the playback manager is configured to calculate the segment significance for the segment, such that the segment significance is calculated as an aggregated sum of object significances for each object appearing in corresponding variable length video chunks associated with the segment.

6. The customizable video playback system of claim 5, wherein each object in the plurality of objects, further comprises at least one object image sample; and wherein the playback manager is configured to execute an image recognition algorithm to recognize a set of recognized image objects with a matching object image sample in the corresponding variable length video chunks associated with the segment, such that a corresponding object significance is added to the aggregated sum of object significances for the segment, for each recognized image object.

7. The customizable video playback system of claim 5, wherein each object in the plurality of objects, further comprises at least one object voice sample, wherein the playback manager is configured to execute a speaker diarization algorithm to recognize a set of recognized voice objects with a matching object voice sample in the corresponding variable length video chunks associated with the segment, such that a corresponding object significance is added to the aggregated sum of object significances for the segment, for each recognized voice object.

8. The customizable video playback system of claim 5, wherein each segment in the ordered segment list of segments further comprises:

a segment included flag, which is a binary flag to denote if the segment is selected as part of the customized video.

9. The customizable video playback system of claim 8, wherein:

the segment included flag is set to true, if the segment significance exceeds a predetermined significance threshold; and wherein the segment included flag is set to false, if the segment significance does not exceed the predetermined significance threshold; and wherein the customizable video playback device is configured to play each corresponding segment in the ordered segment list in a segment order of the ordered segment list for all segments with the segment included flag set to true, such that the video playback device for each corresponding included segment is configured to play each corresponding variable length video chunk corresponding to a corresponding chunk number in the ordered chunk list in a chunk order of the ordered chunk list.

10. A customizable video playback device, comprising:

a dynamic index file, which is configured to sequence selected video chunks from a selected source video in a video database of a customizable video playback server;

wherein the customizable video playback device is configured to enable a user to select the selected source video from a plurality of source videos in the video database of the customizable video playback server;

wherein the customizable video playback device is configured to enable the user to select the selected video chunks from the selected source video;

such that the selected video chunks are sequenced by the dynamic index file, according to sequencing input from the user, to produce a customized video, which is a customization of the selected source video based on sequencing of the selected video chunks, according to the dynamic index file;

wherein each source video in the plurality of source videos of the video database comprises an ordered sequence of segments, wherein each corresponding segment comprises:

an ordered sequence of corresponding video chunks, wherein each video chunk comprises:

a chunk number; and an ordered sequence of video frames, wherein each video frame further comprises:

a frame number;

wherein each video chunk in the ordered sequence of corresponding video chunks comprises a variable number of video frames, such that the ordered sequence of corresponding video chunks comprises variable length video chunks;

such that the corresponding video chunks are each separately configurable with an independent variable length, which is based on a segment length of the corresponding segment, such that an aggregated length of all video chunks in the ordered sequence of corresponding video chunks is equal to the segment length;

whereby the variable length video chunks enable chunking of corresponding segments of the selected source video and the customized video, without any variable length video chunk overlapping between successive segment;

wherein the dynamic index file comprises an ordered segment list of segments, wherein each corresponding segment in the ordered segment list of segments comprises:

a segment number; and an ordered chunk list of at least one chunk number, wherein each chunk number corresponds to a corresponding variable length video chunk of the source video;

wherein each segment in the ordered segment list of segments further comprises:

a segment type, which is selected from a type set, which comprises a dialogue type and a non-dialogue type;

wherein at least one first segment in the ordered segment list of segments is configured with a first segment type of dialogue type and the ordered chunk list of the at least one chunk number is a single-element ordered chunk list of one chunk number only, which corresponds to a dialogue video chunk of a corresponding dialogue segment; and wherein at least one second segment in the ordered segment list of segments is configured with a second segment type of non-dialogue type and the ordered chunk list of the at least one chunk number is a multiple-element ordered chunk list of a plurality of chunk numbers, which each correspond to a non-dialogue video chunk of a corresponding non-dialogue segment;

such that the customizable video playback device is configured to play the customized video.

11. The customizable video playback device of claim 10, wherein the customizable video playback server further comprises:

an object database, which comprises a plurality of objects, each comprising:
an object significance; and a playback manager, which is configured to retrieve and process videos from the video database;

wherein each segment in the ordered segment list of segments further comprises:
a segment significance;

wherein the playback manager is configured to calculate the segment significance for the segment, such that the segment significance is calculated as an aggregated sum of object significances for each object appearing in corresponding variable length video chunks associated with the segment.

12. The customizable video playback device of claim 11, wherein each object in the plurality of objects, further comprises at least one object image sample; and wherein the playback manager is configured to execute an image recognition algorithm to recognize a set of recognized image objects with a matching object image sample in the corresponding variable length video chunks associated with the segment, such that a corresponding object significance is added to the aggregated sum of object significances for the segment, for each recognized image object.

13. The customizable video playback device of claim 10, wherein each segment in the ordered segment list of segments further comprises:

a segment included flag, which is a binary flag to denote if the segment is selected as part of the customized video.

14. A method for customizable video playback, comprising:

(a) selecting a video, comprising a user using a customizable video playback device to select a selected source video from a plurality of source videos in a video database of a customizable video playback server;

(b) selecting video chunks, comprising the user using the customizable video playback device to select a list of variable length video chunks from the selected source video; and (c) Sequencing a customized video, wherein the video chunks are sequenced by a dynamic index file, according to sequencing input from the user, to produce the customized video;

wherein each source video in the plurality of source videos of the video database comprises an ordered sequence of segments, wherein each corresponding segment comprises:

an ordered sequence of corresponding video chunks, wherein each video chunk comprises:
a chunk number; and
an ordered sequence of video frames, wherein each video frame further comprises:
a frame number;

wherein each video chunk in the ordered sequence of corresponding video chunks comprises a variable number of video frames, such that the ordered sequence of corresponding video chunks comprises variable length video chunks;

such that the corresponding video chunks are each separately configurable with an independent variable length, which is based on a segment length of the corresponding segment, such that an aggregated length of all video chunks in the ordered sequence of corresponding video chunks is equal to the segment length;

whereby the variable length video chunks enable chunking of corresponding segments of the selected source video and the customized video, without any variable length video chunk overlapping between successive segment;

wherein the dynamic index file comprises an ordered segment list of segments, wherein each corresponding segment in the ordered segment list of segments comprises:

a segment number; and an ordered chunk list of at least one chunk number, wherein each chunk number corresponds to a corresponding variable length video chunk of the source video;

wherein each segment in the ordered segment list of segments further comprises:

a segment type, which is selected from a type set, which comprises a dialogue type and a non-dialogue type;

wherein at least one first segment in the ordered segment list of segments is configured with a first segment type of dialogue type and the ordered chunk list of the at least one chunk number is a single-element ordered chunk list of one chunk number only, which corresponds to a dialogue video chunk of a corresponding dialogue segment; and wherein at least one second segment in the ordered segment list of segments is configured with a second segment type of non-dialogue type and the ordered chunk list of the at least one chunk number is a multiple-element ordered chunk list of a plurality of chunk numbers, which each correspond to a non-dialogue video chunk of a corresponding non-dialogue segment.

15. The method for customizable video playback of claim 14, further comprising:

playing the customized video, comprising the user using the customizable video playback device to watch the customized video, by playback of the video chunks as sequenced by the dynamic index file.

16. The method for customizable video playback of claim 14, wherein the customizable video playback server further comprises:

an object database, which comprises a plurality of objects, each comprising:
an object significance; and a playback manager, which is configured to retrieve and process videos from the video database;

wherein each segment in the ordered segment list of segments further comprises:
a segment significance; and
a segment included flag, which is a binary flag to denote if the segment is selected as part of the customized video;

wherein the playback manager is configured to calculate the segment significance for the segment, such that the segment significance is calculated as an aggregated sum of object significances for each object appearing in corresponding variable length video chunks associated with the segment;

wherein the segment included flag is set to true, if the segment significance exceeds a predetermined significance threshold; and wherein the segment included flag is set to false, if the segment significance does not exceed the predetermined significance threshold.

17. A customizable video playback system, comprising:

(a) a customizable video playback server, comprising:

a video database, which is configured to store a plurality of source videos; and (b) a customizable video playback device, comprising:

a dynamic index file, which is configured to sequence selected video chunks from a selected source video in the video database;

wherein the customizable video playback device is configured to enable a user to select the selected source video from the plurality of source videos in the video database of the customizable video playback server;

wherein the customizable video playback device is configured to enable the user to select the selected video chunks from the selected source video;

such that the selected video chunks are sequenced by the dynamic index file, according to sequencing input from the user, to produce a customized video, which is a customization of the selected source video based on sequencing of the selected video chunks, according to the dynamic index file;

wherein each source video in the plurality of source videos of the video database comprises an ordered sequence of segments, wherein each corresponding segment comprises:

an ordered sequence of corresponding video chunks, wherein each video chunk comprises:

a chunk number; and an ordered sequence of video frames, wherein each video frame further comprises:

a frame number;

wherein each video chunk in the ordered sequence of corresponding video chunks comprises a variable number of video frames, such that the ordered sequence of corresponding video chunks comprises variable length video chunks;

such that the corresponding video chunks are each separately configurable with an independent variable length, which is based on a segment length of the corresponding segment, such that an aggregated length of all video chunks in the ordered sequence of corresponding video chunks is equal to the segment length;

whereby the variable length video chunks enable chunking of corresponding segments of the selected source video and the customized video, without any variable length video chunk overlapping between successive segment;

wherein the dynamic index file comprises an ordered segment list of segments, wherein each corresponding segment in the ordered segment list of segments comprises:

a segment number; and an ordered chunk list of at least one chunk number, wherein each chunk number corresponds to a corresponding variable length video chunk of the source video;

wherein the customizable video playback server further comprises:

an object database, which comprises a plurality of objects, each comprising:

an object significance; and a playback manager, which is configured to retrieve and process videos from the video database;

wherein each segment in the ordered segment list of segments further comprises:

a segment significance;

wherein the playback manager is configured to calculate the segment significance for the segment, such that the segment significance is calculated as an aggregated sum of object significances for each object appearing in corresponding variable length video chunks associated with the segment such that the customizable video playback device is configured to play the customized video.

* * * * *